United States Patent
Tomokuni et al.

(10) Patent No.: US 8,463,522 B2
(45) Date of Patent: Jun. 11, 2013

(54) VEHICLE RUNNING CONTROL DEVICE

(75) Inventors: Yasuhiko Tomokuni, Shioya-gun (JP); Naoto Sen, Utsunomiya (JP); Akira Sugiyama, Shioya-gun (JP); Tadayoshi Okada, Shioya-gun (JP); Hiroshi Sato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 13/131,915

(22) PCT Filed: Nov. 12, 2009

(86) PCT No.: PCT/JP2009/006039
§ 371 (c)(1),
(2), (4) Date: May 31, 2011

(87) PCT Pub. No.: WO2010/064363
PCT Pub. Date: Jun. 10, 2010

(65) Prior Publication Data
US 2011/0246042 A1 Oct. 6, 2011

(30) Foreign Application Priority Data
Dec. 4, 2008 (JP) .................... 2008-309918

(51) Int. Cl.
*B60T 8/32* (2006.01)
*G05D 1/00* (2006.01)
*F02B 77/08* (2006.01)
(52) U.S. Cl.
USPC ............................................ 701/93; 123/319
(58) Field of Classification Search
USPC ........... 701/93, 96, 70, 110; 123/319, 406.24, 123/406.25, 406.35, 406.36, 406.59, 406.5, 492, 493; 180/170–179, 197, 446
See application file for complete search history.

(56) References Cited

U.S. PATENT DOCUMENTS

| | | | |
|---|---|---|---|
| 6,202,780 B1 * | 3/2001 | Tanaka et al. | 180/179 |
| 7,099,757 B2 | 8/2006 | Niki et al. | |
| 2003/0200021 A1 * | 10/2003 | Aoyama et al. | 701/93 |
| 2003/0233187 A1 * | 12/2003 | Egami | 701/96 |
| 2004/0084237 A1 | 5/2004 | Petrie, Jr. | |
| 2007/0255478 A1 | 11/2007 | Wakashiro et al. | |
| 2008/0076622 A1 | 3/2008 | Manken et al. | |
| 2008/0097677 A1 * | 4/2008 | Kawakami | 701/99 |

FOREIGN PATENT DOCUMENTS

| | | |
|---|---|---|
| DE | 10 2005 017 965 A1 | 10/2006 |
| DE | 10 2005 045 891 B3 | 2/2007 |
| JP | 2003-343305 A | 12/2003 |
| JP | 2005-042699 A | 2/2005 |
| JP | 2007-296976 A | 11/2007 |
| JP | 2008-095635 A | 4/2008 |

* cited by examiner

*Primary Examiner* — Mary Cheung
*Assistant Examiner* — Rodney Butler
(74) *Attorney, Agent, or Firm* — Carrier Blackman & Associates, P.C.; Joseph P. Carrier; William D. Blackman

(57) ABSTRACT

A vehicle running control device including: a vehicle speed sensor which detects an actual vehicle speed; a target vehicle speed setting unit; a target drive force calculation unit; a drive force control unit; a vehicle speed lowering allowance value setting unit; and a target drive force upper limit calculation unit. If the actual vehicle speed lowering amount with respect to the target vehicle speed is within the lowering allowance value, the target drive force calculation unit limits the target drive force to be not greater than the target drive force upper limit and the drive force control unit executes drive force control in accordance with the limited target drive force.

12 Claims, 12 Drawing Sheets

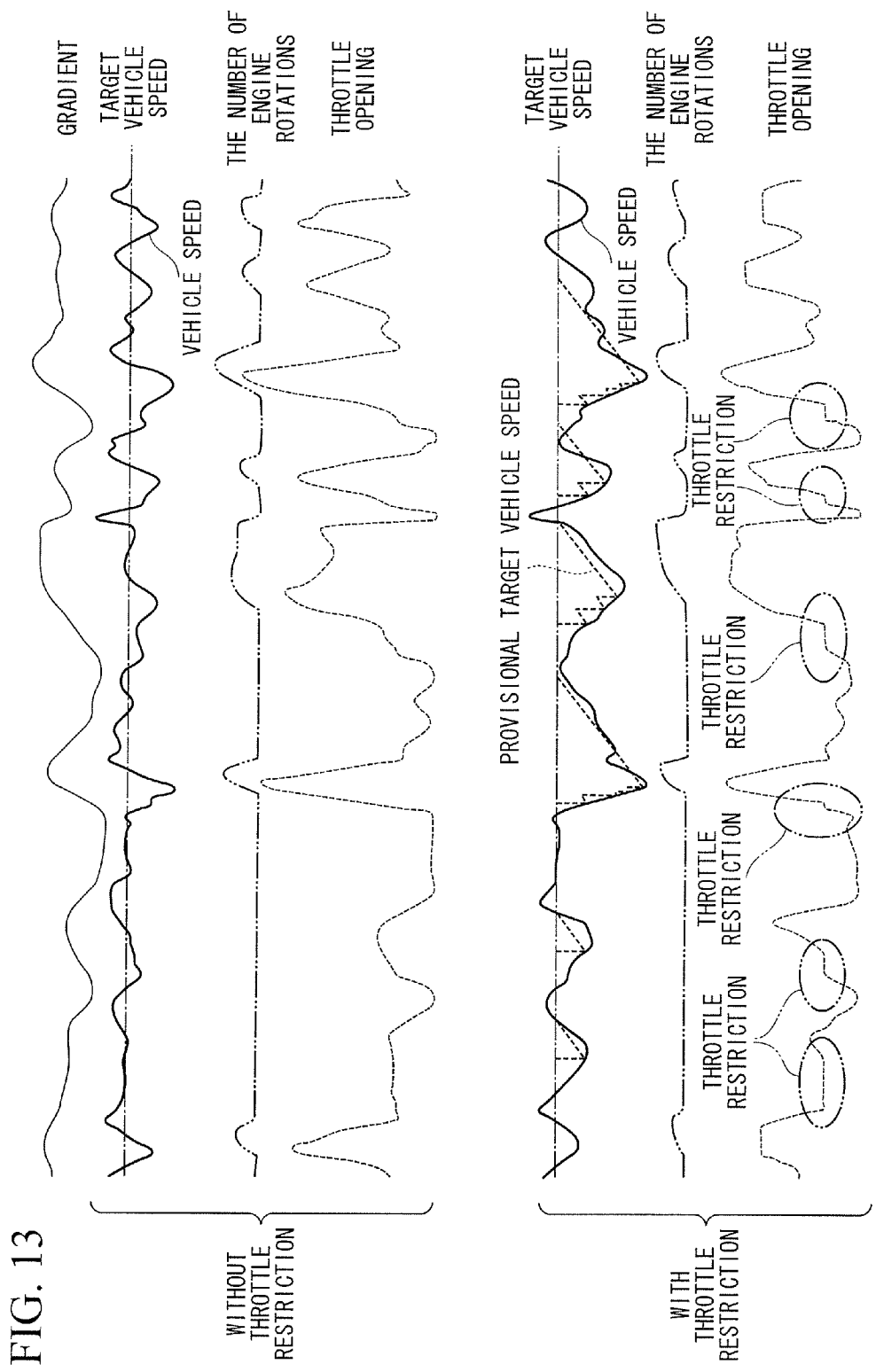

VEHICLE RUNNING CONTROL DEVICE

TECHNICAL FIELD

The present invention relates to a running control device for a vehicle in which constant speed running is possible.

Priority is claimed on Japanese Patent Application No. 2008-309918, filed on Dec. 4, 2008, the contents of which are incorporated herein by reference.

BACKGROUND ART

A running control device for a vehicle, in which constant speed running is possible, performs constant speed running control (hereinafter referred to as cruise control) by comparing the actual vehicle speed with a target vehicle speed set by the driver and adjusting acceleration and deceleration of the vehicle such that the actual vehicle speed corresponds with the target vehicle speed.

Also, the running control device for a vehicle described in, for example, Patent Document 1 described below can carry out the cruise control by a normal mode and the cruise control by a fuel-efficient mode in which fuel efficiency is improved more than in the normal mode. In this running control device for a vehicle, the upper limit value of the number of engine rotations in the fuel-efficient mode and the upper limit value of the number of engine rotations in the normal mode are different from each other.

PATENT DOCUMENTS

[PATENT DOCUMENT 1] Japanese Unexamined Patent Application, First Publication No. 2003-343305

DISCLOSURE OF THE INVENTION

Problem that the Invention is to Solve

In the above-mentioned conventional running control device for a vehicle, since low fuel consumption is attained by restriction of the number of engine rotations, even in a case where running resistance has increased, if the number of engine rotations does not reach a specified value, restriction of the number of engine rotations is not made, and therefore, fuel efficiency is not improved. Accordingly, only when the actual vehicle speed changes or when the state of a driving force transmission device such as the gear ratio, a lock-up clutch, or another clutch changes, restriction is applied to the number of engine rotations. For this reason, in an area where the state of the driving force transmission device does not change, there is a case where low fuel consumption by restriction of the number of engine rotations is not attained. Therefore, it cannot be said that in the cruise control, restriction of the number of engine rotations is the best method of attaining improvements in fuel efficiency.

Therefore, the present invention has an object to provide a running control device for a vehicle, in which improvement in fuel efficiency in cruise control is attained by performing restriction of a driving force.

Means for Solving the Problem

The present invention adopts the following means in order to solve the above-mentioned problem, thereby achieving such an object. That is, (1) A running control device for a vehicle according to the present invention includes: a vehicle speed sensor which detects an actual vehicle speed of the vehicle; a target vehicle speed setting section which sets a target vehicle speed; a target driving force calculation section which calculates a target driving force based on a vehicle speed deviation of the actual vehicle speed detected by the vehicle speed sensor from the target vehicle speed set by the target vehicle speed setting section; a driving force control section which performs driving force control based on the target driving force calculated in the target driving force calculation section; a vehicle speed allowed lowering value setting section which sets an allowed lowering value of the actual vehicle speed with respect to the target vehicle speed; and a target driving force upper limit value calculation section which calculates a target driving force upper limit value based on the actual vehicle speed, wherein in a case where an amount by which the actual vehicle speed is lowered with respect to the target vehicle speed is within the allowed lowering value, the target driving force calculation section restricts the target driving force to be less than or equal to the target driving force upper limit value calculated by the target driving force upper limit value calculation section, and the driving force control section performs driving force control based on the restricted target driving force.

According to the running control device for a vehicle described in the above (1), hypersensitive reaction of a driving force to a load variation caused from unevenness or the like of a road surface can be suppressed by restricting the target driving force to be less than or equal to the target driving force upper limit value.

(2) In the running control device for a vehicle described in the above (1), a configuration may be adopted in which the target driving force upper limit value calculation section calculates a plurality of different target driving force upper limit values, and in a case where the actual vehicle speed has been lowered lower than the target vehicle speed by a value more than or equal to the allowed lowering value, the target driving force calculation section switches the target driving force upper limit value to a larger target driving force upper limit value than a target driving force upper limit value set at this time, thereby performing restriction of the target driving force.

In the case of the above (2), when the actual vehicle speed has been lowered lower than the target vehicle speed by a value more than or equal to the allowed lowering value, after the target driving force upper limit value is switched to a larger value, restriction of the target driving force is performed. Accordingly, since the target driving force upper limit value is finely switched in a fuel-efficient area according to the required driving force of the vehicle, an area exhibiting a fuel-efficiency effect can be expanded without a sense of discomfort.

(3) In the case of the above (2), a configuration may be adopted in which the allowed lowering value setting section sets allowed lowering values corresponding to magnitudes of the plurality of target driving force upper limit values calculated by the target driving force upper limit value calculation section and sets the allowed lowering value such that the larger the target driving force upper limit value in the plurality of target driving force upper limit values, the larger the allowed lowering value.

In the case of the above (3), the allowed lowering value is set such that the larger the target driving force upper limit value, the larger the allowed lowering value. For this reason, since the larger the set target driving force upper limit value, the more an area of output restriction by the target driving force upper limit value can be expanded, an area having a fuel efficiency effect can be expanded without a sense of discomfort.

(4) In the case of the above (2), a configuration may be adopted in which when performing switching of the target driving force upper limit value, the target driving force calculation section calculates the target driving force by using a provisional target vehicle speed obtained based on the current actual vehicle speed or the target vehicle speed, in place of an original target vehicle speed set by the target vehicle speed setting section and gradually approximates the provisional target vehicle speed to the original target vehicle speed.

In the case of the above (4), when performing switching of the target driving force upper limit value, the provisional target vehicle speed is set. Then, by using this in place of the original target vehicle speed, the target driving force is calculated. For this reason, a rapid increase in a driving force at the time of the switching of the target driving force upper limit value can be prevented. Also, by gradually approximating (transitioning) the provisional target vehicle speed to the original target vehicle speed, recovery control which returns the lowered vehicle speed to the original target vehicle speed can be carried out without sudden acceleration. Accordingly, return to an original control state can be performed with the output of a small driving force.

(5) In the case of the above (4), a configuration may be adopted in which the target driving force calculation section gradually approximates the provisional target vehicle speed to the original target vehicle speed by restricting a variation per unit time of the provisional target vehicle speed and calculates a variation restriction value per unit time of the provisional target vehicle speed based on the actual vehicle speed or a deviation of the actual vehicle speed from the original target vehicle speed.

In the case of the above (5), the variation restriction value per unit time of the provisional target vehicle speed is calculated based on the actual vehicle speed or a deviation of the actual vehicle speed from the original target vehicle speed. Accordingly, since it is possible to set an optimal variation restriction value in accordance with the actual vehicle speed, improvement in fuel efficiency can be attained. Also, the provisional target vehicle speed can be returned to the original target vehicle speed without causing a sense of discomfort to a driver.

(6) In the case of the above (4), a configuration may be adopted in which in a case where the actual vehicle speed has become greater than or equal to the original target vehicle speed while the provisional target vehicle speed is made to gradually approximate the original target vehicle speed, the target driving force calculation section stops calculation of the target driving force using the provisional target vehicle speed and starts calculation of the target driving force using the original target vehicle speed.

In the case of the above (6), when the vehicle speed rises due to running downhill, or a change in the target vehicle speed towards deceleration due to the driver's operation, the actual vehicle speed sometimes becomes greater than or equal to the original target vehicle speed. In such a case, by immediately performing return to control using the original target vehicle speed, control of a driving force can be returned to the original state without causing a sense of discomfort to the driver.

(7) In the case of the above (5), a configuration may be adopted in which in a case where the actual vehicle speed has become greater than the provisional target vehicle speed by a value more than or equal to a predetermined value while the provisional target vehicle speed is made to gradually approximate the original target vehicle speed, the target driving force calculation section sets the value of the current actual vehicle speed as the provisional target vehicle speed or increases the provisional target vehicle speed to be more than or equal to the variation restriction value.

In the case of the above (7), when the actual vehicle speed has become greater than the provisional target vehicle speed by a value more than or equal to a predetermined value, the value of the current actual vehicle speed is set as the provisional target vehicle speed or the provisional target vehicle speed is increased more than or equal to the variation restriction value. Accordingly, since the provisional target vehicle speed increases to the usual or greater, the actual vehicle speed can quickly converge to the original target vehicle speed.

(8) In the case of the above (1), a configuration may be adopted in which the running control device further includes a gradient amount acquisition section which acquires an amount of gradient of a subject vehicle running path, and the target driving force upper limit value calculation section calculates the target driving force upper limit value based on the amount of gradient acquired by the gradient amount acquisition section.

According to the invention related to the above (8), by calculating the target driving force upper limit value based on the amount of gradient acquired by the gradient amount acquisition section, the target driving force upper limit value can be more finely set with respect to a load variation.

(9) In the case of the above (2), a configuration may be adopted in which the running control device further includes a gradient amount acquisition section which acquires an amount of gradient of a subject vehicle running path, the target driving force upper limit value calculation section calculates the target driving force upper limit value based on the amount of gradient acquired by the gradient amount acquisition section, and in a case where the amount by which the actual vehicle speed is lowered with respect to the target vehicle speed is larger than the allowed lowering value and the amount of gradient acquired by the gradient amount acquisition section becomes more than or equal to a predetermined determination threshold value, the target driving force calculation section performs restriction of the target driving force by using a larger target driving force upper limit value than a target driving force upper limit value set at this time.

In the case of the above (9), when the amount by which the actual vehicle speed is lowered with respect to the target vehicle speed is larger than the allowed lowering value and the acquired amount of gradient of the road becomes more than or equal to a predetermined determination threshold value, restriction of the target driving force is performed by using a larger target driving force upper limit value. Accordingly, it is possible to more reliably perform a determination of switching permission of the target driving force upper limit value, compared to a case where a gradient condition is not added.

(10) In the case of the above (8), a configuration may be adopted in which the allowed lowering value setting section increases the allowed lowering value of the actual vehicle speed with respect to the target vehicle speed in accordance with an increase in the amount of gradient acquired by the gradient amount acquisition section.

In the case of the above (10), by increasing the allowed lowering value of the actual vehicle speed with respect to the target vehicle speed in accordance with an increase in the acquired amount of gradient of a road, control of the driving force can be realized without making the driver feel a sense of discomfort and also improvement in fuel efficiency can be attained.

(11) In the case of the above (8), a configuration may be adopted in which the target driving force calculation section gradually approximates a provisional target vehicle speed to an original target vehicle speed by restricting a variation per unit time of the provisional target vehicle speed and calculates a variation restriction value per unit time of the provisional target vehicle speed based on the amount of gradient acquired by the gradient amount acquisition section.

In the case of (11) above, by calculating the variation restriction value per unit time of the provisional target vehicle speed based on the acquired amount of gradient of a road, improvement in fuel efficiency can be attained. For example, if the variation restriction value is set to be small at the time of a rising gradient, transition to the original target vehicle speed can be performed slowly. As a result, since the driving force output on an uphill road is kept low, fuel efficiency is improved. On the other hand, on a downhill road, naturally, the output of the driving force of an engine is small. For this reason, if the variation restriction value is set to be large at the time of a downhill gradient, since return to the original target vehicle speed can be positively performed, fuel efficiency is improved. Also, despite the downhill road, if return of the actual vehicle speed to the original target vehicle speed is slow, the driver feels a sense of discomfort. Therefore, if the variation restriction value is set to be large at the time of a downhill gradient, it is possible to not make the driver feel such a sense of discomfort.

(12) In the case of the above (1), a configuration may be adopted in which the running control device further includes a mode switching section which switches a driving force control content between a normal mode that restricts the target driving force and a fuel-efficient mode that further restricts the target driving force than in the normal mode, and the target driving force upper limit value in the normal mode is made to be different from the target driving force upper limit value in the fuel-efficient mode.

In the case of the above (12), the driver can select any one of driving force control which is subjected to restriction of the target driving force upper limit value in the normal mode and driving force control which is subjected to restriction of the target driving force upper limit value in the fuel-efficient mode.

Effects of the Invention

According to the running control device for a vehicle according to the present invention, in the cruise control, restriction of a driving force can be performed. Accordingly, since the driving force of the engine can be accurately restricted regardless of the vehicle speed or the state of a driving force transmission device, fuel efficiency in the cruise control can be improved.

BRIEF DESCRIPTION OF THE DRAWINGS

FIG. 13 is time charts of a case where the throttle opening control according to the embodiment is carried out, and a comparative example where the throttle opening control is carried out without performing throttle opening restriction.

DESCRIPTION OF EMBODIMENTS

Hereinafter, a running control device for a vehicle according to an embodiment of the present invention will be described with reference to the drawings of FIGS. 1 to 13.

Figure 1:
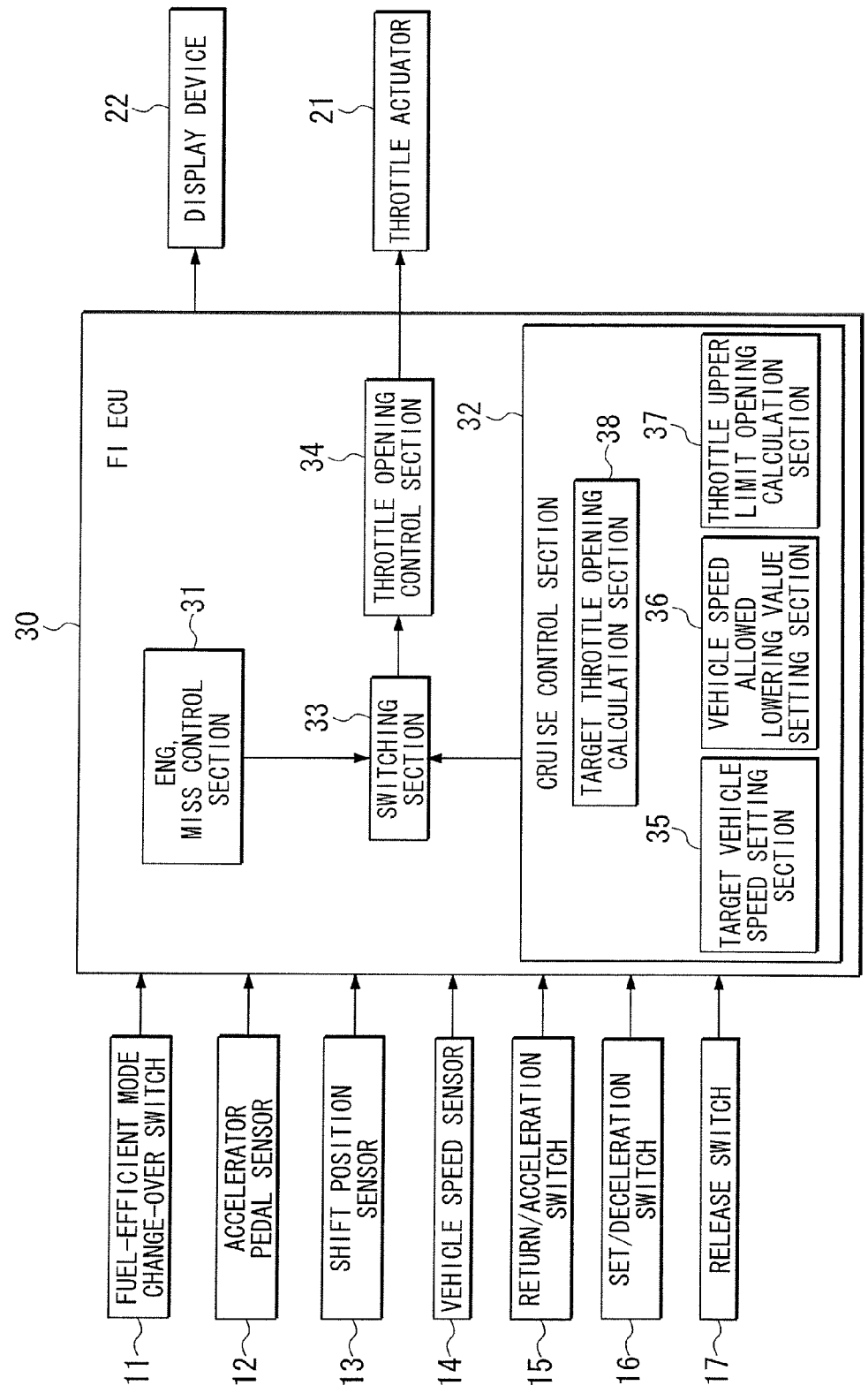
FIG. 1 is a block diagram of a running control device for a vehicle according to an embodiment of the present invention.

As shown in FIG. 1, the running control device for a vehicle of this embodiment includes a fuel-efficient mode change-over switch 11, an accelerator pedal sensor 12, a shift position sensor 13, a vehicle speed sensor 14, a return/acceleration switch 15, a set/deceleration switch 16, a release switch 17, a throttle actuator 21, a display device 22, and an electronic control device (FI-ECU) 30.

The fuel-efficient mode change-over switch 11 is a switch which is operated by the driver when changing over the operation mode between a normal mode and a fuel-efficient mode which gives preference to improvement in fuel efficiency over the normal mode. The fuel-efficient mode change-over switch 11 is normally in an OFF state and at this time, is set to be in the normal mode. If the fuel-efficient mode change-over switch 11 is operated to be ON, switching from the normal mode to the fuel-efficient mode is performed. On the other hand, if this switch is operated to be OFF, switching from the fuel-efficient mode to the normal mode is performed.

The accelerator pedal sensor 12 detects the degree of opening of an accelerator pedal, which represents a stepped-on amount of the accelerator pedal by the driver.

The shift position sensor 13 detects a shift position which represents the position of a selection lever (not shown) for allowing the driver to select the state of a transmission mechanism (not shown).

The vehicle speed sensor 14 detects the present running speed (hereinafter referred to as actual vehicle speed) of the subject vehicle based on the number of rotations of a wheel.

The return/acceleration switch 15, the set/deceleration switch 16, and the release switch 17 are switches which are operated in the case of performing cruise control. The cruise control compares a target vehicle speed set by the driver with the actual vehicle speed which is detected by the vehicle speed sensor 14. Then, a vehicle runs at a constant speed by controlling acceleration and deceleration of a vehicle such that the actual vehicle speed corresponds with the target vehicle speed.

If during running, the set/deceleration switch 16 is operated to be ON, after the actual vehicle speed at that time becomes the target vehicle speed, the cruise control is started.

In the cruise control, if the return/acceleration switch 15 is operated to be ON, the target vehicle speed increases in accordance with the number of times of operation of the switch or the operated time. On the other hand, if during the cruise control, the set/deceleration switch 16 is operated to be ON, the target vehicle speed decreases in accordance with the number of times of operation of the switch or the operated time. Then, if during the cruise control, a brake pedal is stepped on or the release switch 17 is operated to be ON, the cruise control is released. Thereafter, if the return/acceleration switch 15 is operated to be ON, the cruise control is restarted.

The outputs of these switches 11, 15, 16, and 17 and sensors 12, 13, and 14 are input to the FI-ECU 30. Then, the FI-ECU 30 outputs the result of a processing required for throttle opening control, which has been performed based on these inputs, to the throttle actuator 21 and the display device 22.

The throttle actuator 21 carries out opening and closing operation of a throttle of an engine (internal combustion engine). Also, the display device 22 displays the operational status (vehicle speed, fuel efficiency, or the like), the control state (operation mode or the like) of the vehicle, the target vehicle speed, or the like set by the driver's operation, on a predetermined display section.

The FI-ECU 30 is an electronic control device which controls the degree of opening of the throttle of the engine, and includes an engine and transmission control section 31, a cruise control section 32, a switching section 33, and a throttle opening control section 34.

The engine and transmission control section 31 outputs the result of the target value (that is, a target throttle opening) of the throttle opening of the engine calculated from the output of the accelerator pedal sensor 12, the shift position sensor 13, the vehicle speed sensor 14 or the like to the switching section 33 when not performing the cruise control.

The cruise control section 32 outputs the result of the target value (that is, the target throttle opening) of the throttle opening of the engine calculated from the output of the vehicle speed sensor 14, the fuel-efficient mode change-over switch 11, the return/acceleration switch 15, the set/deceleration switch 16, or the like, to the switching section 33 when performing the cruise control from now and during performing of the cruise control.

The switching section 33 switches the target throttle opening which is output to the throttle opening control section 34. Then, in a case where the cruise control is performed, the switching section 33 outputs the larger value out of the target throttle opening input from the cruise control section 32 and a throttle opening based on an accelerator pedal operation of the driver to the throttle opening control section 34. On the other hand, in a case where the cruise control is not performed, the switching section 33 outputs the target throttle opening input from the engine and transmission control section 31, to the throttle opening control section 34.

The throttle opening control section 34 controls the throttle actuator 21 based on the target throttle opening input from the switching section 33 and controls the throttle opening of the engine so as to correspond with the target throttle opening.

The cruise control section 32 includes a target vehicle speed setting section (target vehicle speed setting means) 35, a vehicle speed allowed lowering value setting section (vehicle speed allowed lowering value setting means) 36, a throttle upper limit opening calculation section (target driving force upper limit value calculating means) 37, and a target throttle opening calculation section (target driving force calculating means) 38.

The target vehicle speed setting section 35 sets the target vehicle speed at the time of the cruise control based on an operation of the return/acceleration switch 15 or the set/deceleration switch 16 by the driver, as described above.

The vehicle speed allowed lowering value setting section 36 sets an allowance value of an amount by which the actual vehicle speed is lowered with respect to the target vehicle speed at the time of the cruise control (in other words, an allowable width representing to what extent the actual vehicle speed may be lowered from the target vehicle speed at the time of the cruise control). Hereinafter, this allowed lowering value is referred to as a vehicle speed deviation threshold value. The vehicle speed deviation threshold value is set based on the target vehicle speed and a road gradient during the current running.

The throttle upper limit opening calculation section 37 calculates a throttle opening upper limit value (that is, a throttle upper limit opening (target driving force upper limit value)) based on the actual vehicle speed, a vehicle speed deviation of the actual vehicle speed from the target vehicle speed, the acceleration of the vehicle, a road gradient during the current running, present fuel efficiency, or the like.

In addition, the road gradient during the current running is acquired by estimation of the engine and transmission control section 31 based on, for example, engine torque, running resistance, or the like. In this embodiment, a gradient amount acquiring means is realized by the engine and transmission control section 31.

The target throttle opening calculation section 38 basically calculates the target throttle opening (target driving force) based on the vehicle speed deviation of the actual vehicle speed from the target vehicle speed. However, in this embodiment, the target throttle opening is restricted by the throttle upper limit opening calculated in the throttle upper limit opening calculation section 37.

Specifically, in a case where the amount by which the actual vehicle speed is lowered with respect to the target vehicle speed is within the vehicle speed deviation threshold value set in the vehicle speed allowed lowering value setting section 36, the target throttle opening is restricted to be less than or equal to the throttle upper limit opening calculated by the throttle upper limit opening calculation section 37. On the other hand, in a case where the amount by which the actual vehicle speed is lowered with respect to the target vehicle speed exceeds the vehicle speed deviation threshold value set in the vehicle speed allowed lowering value setting section 36 (in other words, in a case where the actual vehicle speed is lowered lower than the target vehicle speed by a value more than or equal to the vehicle speed deviation threshold value), switching to a larger throttle upper limit opening is performed. Then, after the target throttle opening is restricted to be less than or equal to this throttle upper limit opening, this target throttle opening is set.

Also, in the case of switching the throttle upper limit opening to a larger throttle upper limit opening, the target throttle opening calculation section 38 sets a provisional target vehicle speed (hereinafter referred to as a provisional target vehicle speed) based on the current actual vehicle speed or the target vehicle speed. Then, a vehicle speed deviation from the actual vehicle speed is calculated by using the provisional target vehicle speed in place of an original target speed. Further, the target throttle opening is calculated based on this vehicle speed deviation. Thereafter, a processing of gradually approximating the provisional target vehicle speed to the original target vehicle speed (hereinafter referred to as a target vehicle speed return processing) is performed.

By setting the provisional target vehicle speed in this manner, a rapid increase of the throttle opening (that is, a rapid increase of the driving force) accompanying switching of the throttle upper limit opening can be prevented. Further, by gradually approximating the provisional target vehicle speed to the original target vehicle speed, recovery control which returns the lowered vehicle speed to the original target vehicle speed can be carried out without sudden acceleration. Accordingly, return to an original control state can be performed with the output of a small driving force.

Next, the outline of the throttle opening control at the time of the cruise control by the running control device for a vehicle according to the present invention will be described based on an uphill road model of FIG. 2.

In this running control device for a vehicle, when a variation in load has generated at the time of the cruise control, in order to prevent deterioration of fuel efficiency due to excessive control of the throttle opening, a plurality of modes (hereinafter referred to as CC eco-modes) is set with respect to the same target vehicle speed. Then, with respect to each of these CC eco-modes, the throttle upper limit opening and the vehicle speed deviation threshold value are set.

In these CC eco-modes, in a case where the vehicle speed deviation of the actual vehicle speed with respect to the target vehicle speed is within the vehicle speed deviation threshold value in the CC eco-mode, after the target throttle opening is set in a range which does not exceed the throttle upper limit opening in the CC eco-mode, the throttle opening is controlled.

Then, in a case where the vehicle speed deviation of the actual vehicle speed with respect to the target vehicle speed exceeds the vehicle speed deviation threshold value in the CC eco-mode even if the throttle upper limit opening of the CC eco-mode is maintained, transition from the CC eco-mode to the CC eco-mode of the next grade is performed.

In this embodiment, the CC eco-modes of five grades from the lowest CC eco-mode 1 to the topmost CC eco-mode 5 are set. Then, a throttle upper limit opening THh and a vehicle speed deviation threshold value $\Delta Vcc$ according to a running state are set with respect to each of the CC eco-modes 1 to 4. Here, the throttle upper limit opening THh is set to be a larger value as the CC eco-mode is set to be upper grade. Also, the vehicle speed deviation threshold value $\Delta Vcc$ is also set to be a larger value as the CC eco-mode is set to be upper grade.

Figure 2:
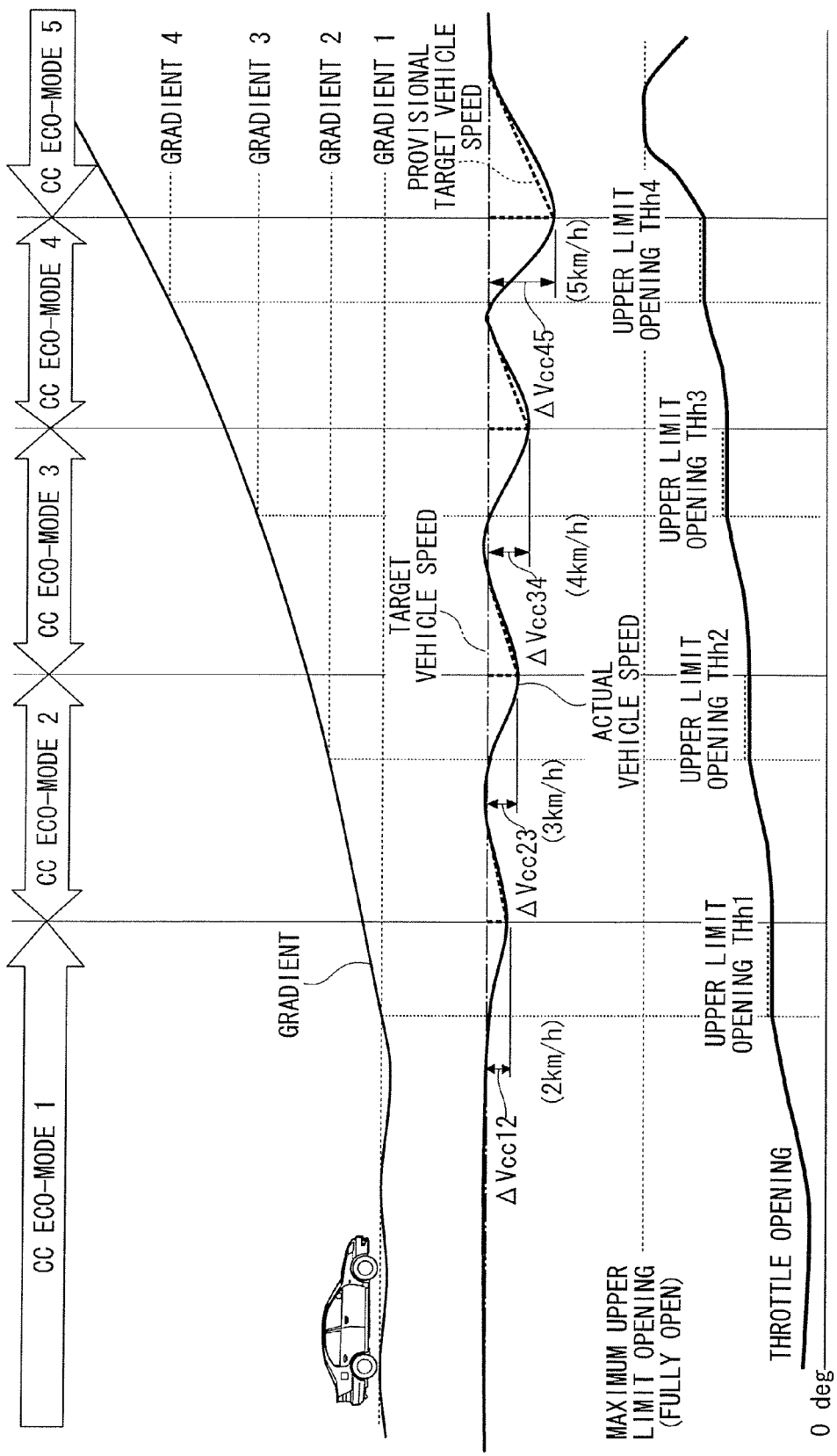
FIG. 2 is a time chart describing throttle opening control at the time of cruise control running on an uphill road of the running control device for a vehicle according to the embodiment.

In the example shown in FIG. 2, a vehicle speed deviation threshold value $\Delta Vcc12$ in the CC eco-mode 1 is 2 km/h, a vehicle speed deviation threshold value $\Delta Vcc23$ in the CC eco-mode 2 is 3 km/h, a vehicle speed deviation threshold value $\Delta Vcc34$ in the CC eco-mode 3 is 4 km/h, and a vehicle speed deviation threshold value $\Delta Vcc45$ in the CC eco-mode 4 is 5 km/h. In addition, the throttle upper limit opening in the topmost CC eco-mode 5 is throttle full opening.

Hereinafter, an embodiment in the case of performing cruise control running on an uphill road where a gradient gradually increases will be described in time series with reference to FIG. 2.

As shown in FIG. 2, when the vehicle performs the cruise control running on an almost flat road, among the CC eco-modes, the CC eco-mode 1 where both the throttle upper limit opening THh and the vehicle speed deviation threshold value $\Delta Vcc$ are set to be the smallest values is applied.

In the CC eco-mode 1, in a case where a vehicle speed deviation $\Delta V$ of the actual vehicle speed with respect to the target vehicle speed is within the vehicle speed deviation threshold value $\Delta Vcc12$ (in the example of FIG. 2, 2 km/h) in the CC eco-mode 1, after the target throttle opening is set in a range which does not exceed a throttle upper limit opening THh1 in the CC eco-mode 1, the throttle opening is controlled.

First, in a period in which a road gradient is small, the cruise control running with the CC eco-mode 1 is possible. Next, if the vehicle advances to an uphill road, since running resistance increases as the road gradient becomes gradually larger, the actual vehicle speed is reduced. Here, if the target throttle opening is maintained at the throttle upper limit opening THh1 in the CC eco-mode 1, it does not become possible to suppress the vehicle speed deviation $\Delta V$ to be within the vehicle speed deviation threshold value $\Delta Vcc12$.

In such a case, a change from the CC eco-mode 1 to the CC eco-mode 2 of the next grade is performed and the other hand, the throttle upper limit opening THh and the vehicle speed deviation threshold value $\Delta Vcc$ are respectively changed into larger values (THh2 and $\Delta Vcc23$) than those in the CC eco-mode 1.

In the case of switching from the CC eco-mode 1 to the CC eco-mode 2, the provisional target vehicle speed is set based on the current actual vehicle speed or the target vehicle speed. Then, the vehicle speed deviation $\Delta V$ of the actual vehicle speed is calculated by using the provisional target vehicle speed in place of the original target vehicle speed. Further, the target throttle opening is calculated based on this vehicle speed deviation $\Delta V$ and on the other hand, the provisional target vehicle speed is made to gradually approximate the original target vehicle speed by performing the target vehicle speed return processing.

In the CC eco-mode 2, in a case where the vehicle speed deviation $\Delta V$ of the actual vehicle speed with respect to the target vehicle speed is within the vehicle speed deviation threshold value $\Delta Vcc23$ (in the example of FIG. 2, 3 km/h) in the CC eco-mode 2, after the target throttle opening is set in a range which does not exceed a throttle upper limit opening THh2 in the CC eco-mode 2, the throttle opening is controlled.

In the CC eco-mode 2, if as the road gradient further increases, since running resistance further increase, the actual vehicle speed is reduced. Here, if the target throttle opening is maintained at the throttle upper limit opening THh2 in the CC eco-mode 2, it does not become possible to suppress the vehicle speed deviation $\Delta V$ to be within the vehicle speed deviation threshold value $\Delta Vcc23$.

In such a case, a change from the CC eco-mode 2 to the CC eco-mode 3 of the next grade is performed and on the other hand, the throttle upper limit opening THh and the vehicle speed deviation threshold value $\Delta Vcc$ are respectively changed into larger values (THh3 and $\Delta Vcc34$) than those in the CC eco-mode 2.

Also in the case of switching from the CC eco-mode 2 to the CC eco-mode 3, the provisional target vehicle speed is set similarly to the case of switching from the CC eco-mode 1 to the CC eco-mode 2. Then, the target throttle opening is calculated by using this provisional target vehicle speed in place of the original target vehicle speed and on the other hand, the provisional target vehicle speed is made to gradually approximate the original target vehicle speed by performing the target vehicle speed return processing.

In the CC eco-mode 3, in a case where the vehicle speed deviation ΔV of the actual vehicle speed with respect to the target vehicle speed is within the vehicle speed deviation threshold value ΔVcc34 (in the example of FIG. 2, 4 km/h) in the CC eco-mode 3, after the target throttle opening is set in a range which does not exceed a throttle upper limit opening THh3 in the CC eco-mode 3, the throttle opening is controlled.

In the CC eco-mode 3, if as the road gradient further increases, since running resistance further increase, the actual vehicle speed is reduced. Here, if the target throttle opening is maintained at the throttle upper limit opening THh3 in the CC eco-mode 3, it does not become possible to suppress the vehicle speed deviation ΔV to be within the vehicle speed deviation threshold value ΔVcc34.

In such a case, a change from the CC eco-mode 3 to the CC eco-mode 4 of the next grade is performed and on the other hand, the throttle upper limit opening THh and the vehicle speed deviation threshold value ΔVcc are respectively changed into larger values (THh4 and ΔVcc45) than those in the CC eco-mode 3.

Also in the case of switching from the CC eco-mode 3 to the CC eco-mode 4, the provisional target vehicle speed is set similarly to the case of switching from the CC eco-mode 1 to the CC eco-mode 2. Then, the target throttle opening is calculated by using this provisional target vehicle speed in place of the original target vehicle speed and on the other hand, the provisional target vehicle speed is made to gradually approximate the original target vehicle speed by performing the target vehicle speed return processing.

In the CC eco-mode 4, in a case where the vehicle speed deviation ΔV of the actual vehicle speed with respect to the target vehicle speed is within the vehicle speed deviation threshold value ΔVcc45 (in the example of FIG. 2, 5 km/h) in the CC eco-mode 4, after the target throttle opening is set in a range which does not exceed a throttle upper limit opening THh4 in the CC eco-mode 4, the throttle opening is controlled.

In the CC eco-mode 4, if as the road gradient further increases, since running resistance further increases, the actual vehicle speed is reduced. Here, if the target throttle opening is maintained at the throttle upper limit opening THh4 in the CC eco-mode 4, it does not become possible to suppress the vehicle speed deviation ΔV to be within the vehicle speed deviation threshold value ΔVcc45.

In such a case, a change from the CC eco-mode 4 to the CC eco-mode 5 which is the topmost grade is performed and on the other hand, the throttle upper limit opening THh is set to be fully open. At this time, the vehicle speed deviation threshold value ΔVcc is not set.

Also in the case of switching from the CC eco-mode 4 to the CC eco-mode 5, the provisional target vehicle speed is set similarly to the case of switching from the CC eco-mode 1 to the CC eco-mode 2. Then, the target throttle opening is calculated by using this provisional target vehicle speed in place of the original target vehicle speed and on the other hand, the provisional target vehicle speed is made to gradually approximate the original target vehicle speed by performing the target vehicle speed return processing.

In the CC eco-mode 5, after the target throttle opening is set in a range up to throttle opening fully open, the throttle opening is controlled.

In this manner, by being provided with a plurality of throttle upper limit openings THh, it is possible to finely switch the throttle upper limit opening THh in a fuel-efficient area in accordance with the required driving force of the vehicle, so that an area exhibiting a fuel-efficiency effect can be expanded without a sense of discomfort. In other words, since the throttle upper limit opening is switched in accordance with the road gradient, the effect of improvement in fuel efficiency is large.

Also, if the vehicle speed deviation ΔV does not exceed the vehicle speed deviation threshold value ΔVcc in each CC eco-mode, since the CC eco-mode is not changed, the throttle upper limit opening THh does not increase. Accordingly, since a change of the CC eco-mode at unevenness or the like of the road surface while running can be suppressed (that is, since switching of the throttle upper limit opening can be suppressed), it contributes to an improvement in fuel efficiency.

Further, while the vehicle speed deviation threshold value ΔVcc is set corresponding to the magnitude of the throttle upper limit opening THh, the vehicle speed deviation threshold value ΔVcc is set such that the larger the throttle upper limit opening THh, the larger the vehicle speed deviation threshold value. Accordingly, since the larger the set throttle upper limit opening THh, the more an area of output restriction by the throttle upper limit opening THh can be expanded, the area having a fuel efficiency effect can be expanded without a sense of discomfort.

Next, the details of the throttle opening control at the time of the cruise control in this embodiment will be described based on the flow charts of FIGS. 3 to 10.

Figure 3:
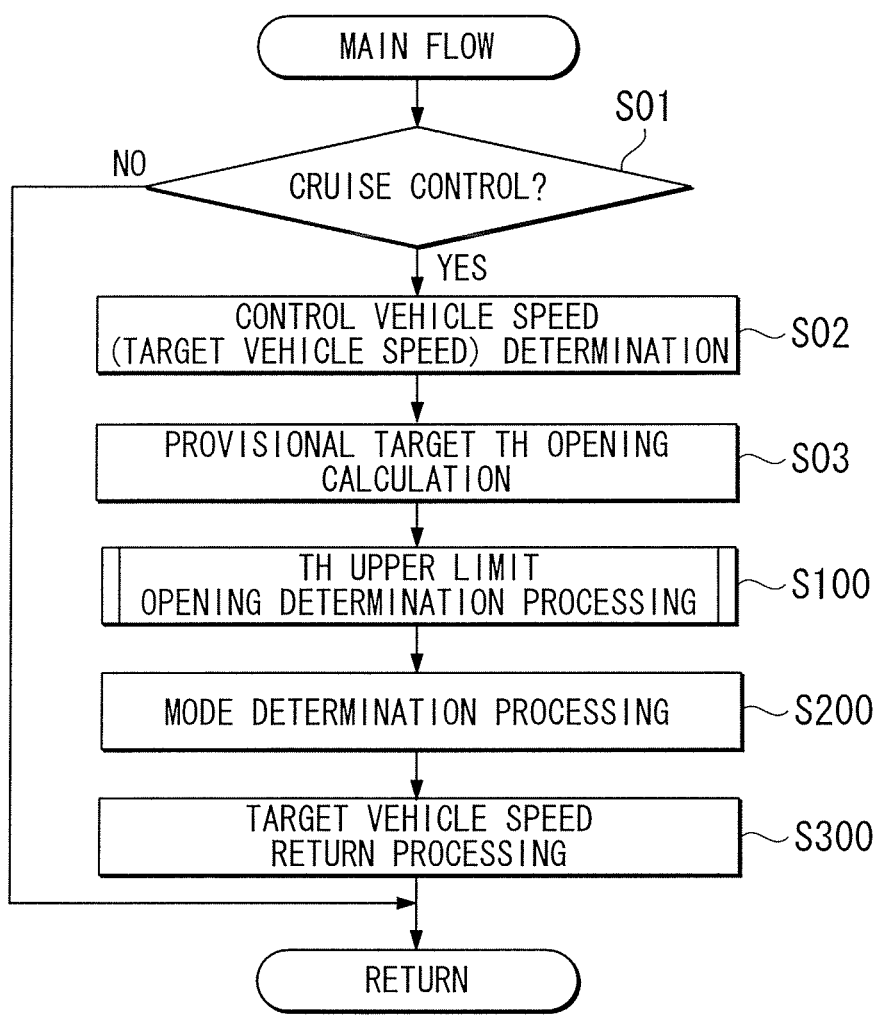
FIG. 3 is a flow chart showing a main routine of the throttle opening control at the time of cruise control of the running control device for a vehicle according to the embodiment.

The flow chart shown in FIG. 3 shows a main routine of the cruise control. This processing is repeatedly executed by the FI-ECU 30.

First, in step S01, it is determined whether or not the cruise control is being executed. Here, when the set/deceleration switch 16 is operated to be ON when the cruise control is not executed, an affirmative determination is made in the step S01. On the other hand, when the release switch 17 is operated to be ON during execution of the cruise control, a negative determination is made in the step S01.

In a case where the determination result in the step S01 is "NO", return is carried out.

In a case where the determination result in the step S01 is "YES", after it proceeds to step S02, the target vehicle speed which becomes a control vehicle speed is determined. For example, if during running, the set/deceleration switch 16 is operated to be ON, the actual vehicle speed at that time is determined as the target vehicle speed. Also, if during cruise control execution, the return/acceleration switch 15 is operated to be ON, the target vehicle speed increases in accordance with the number of times of operation or operation duration. On the other hand, if during cruise control execution, the set/deceleration switch 16 is operated to be ON, the target vehicle speed decreases in accordance with the number of times of operation or in accordance with operation duration.

Next, after it proceeds to step S03, the amount of increase and decrease of the throttle opening is calculated in accordance with the vehicle speed deviation ΔV of the actual vehicle speed which is detected by the vehicle speed sensor from the target vehicle speed determined in the step S02. Then, the target throttle opening is calculated based on the amount of increase and decrease. Here, the target throttle opening which is calculated in the step S03 is a target throttle opening before being subjected to restriction (hereinafter referred to as a provisional target throttle opening).

Next, after it proceeds to step S100, the throttle upper limit opening is determined. Then, a processing of restricting the provisional target throttle opening calculated in the step S03 is executed. Then, for determination of the throttle upper limit opening which is performed in the next control period, it proceeds to step S200 and a mode determination processing is then executed. Then, after it proceeds to step S300, the target vehicle speed return processing is executed. Thereafter, return is performed.

Hereinafter, the throttle upper limit opening determination processing in the step S100, the mode determination processing in the step S200, and the target vehicle speed return processing in the step S300 are described sequentially.

Throttle Upper Limit Opening Determination Processing

Figure 4:
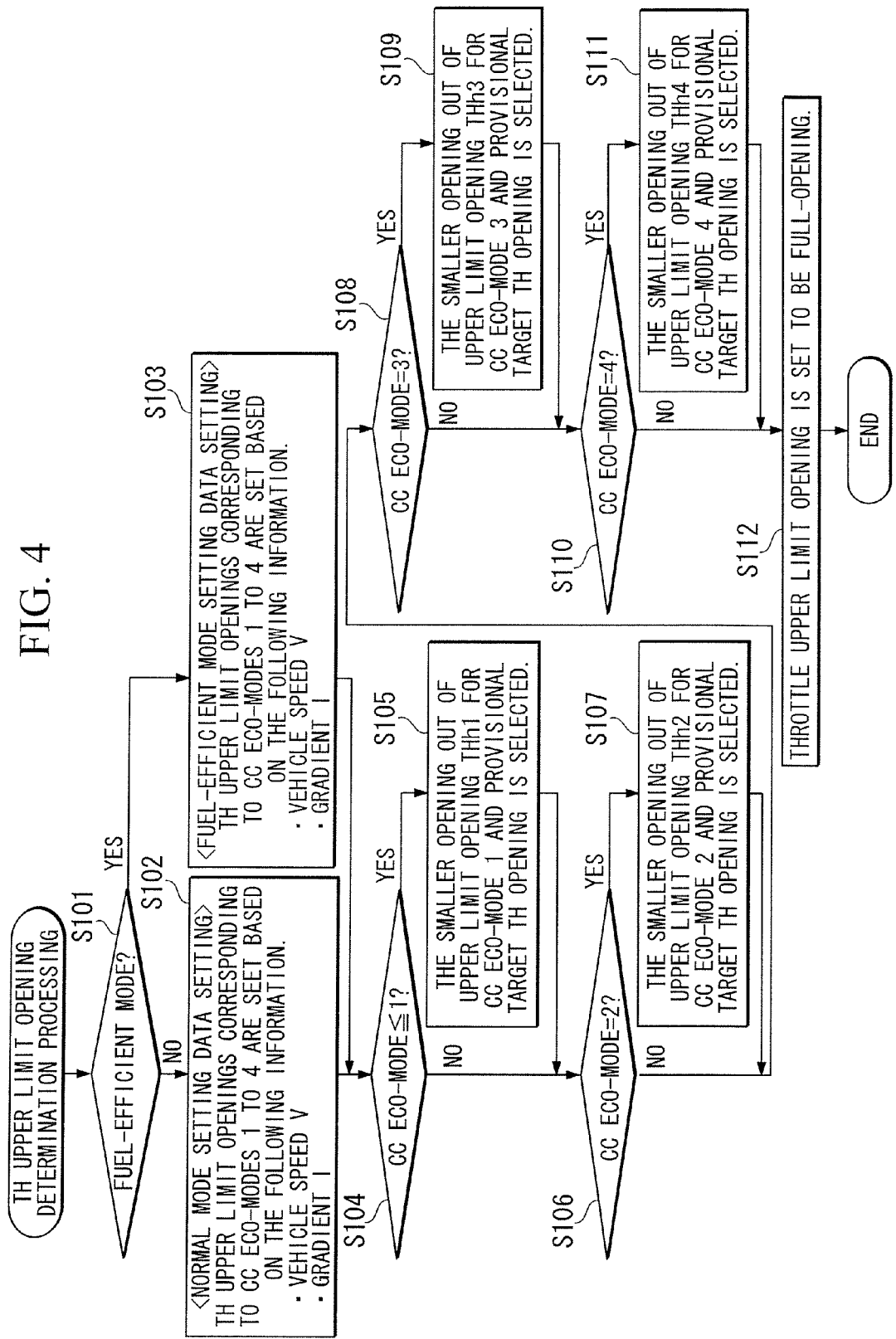
FIG. 4 is a flow chart showing a throttle upper limit opening determination processing at the time of the cruise control of the running control device for a vehicle according to the embodiment.

First, the throttle upper limit opening determination processing which is executed in the step S100 will be described in accordance with the flow chart of FIG. 4.

First, in step S101, it is determined whether or not a fuel-efficient mode is selected.

In a case where the determination result in the step S101 is "NO", it proceeds to step S102. Then, the throttle upper limit openings THh1, THh2, THh3, and THh4 of the CC eco-modes 1, 2, 3, and 4 at the time of the normal mode are set with reference to a throttle upper limit opening map for the normal mode (not shown) based on the following information (a) and (b). In addition, the magnitude relation of the throttle upper limit openings THh is set to be the relationship of THh1<THh2<THh3<THh4.

(a) The Current Actual Vehicle Speed V (b) The Gradient (Road Gradient) I of a Road where the Vehicle is Running at Present In addition, a correlation between the throttle upper limit opening THh and the above-mentioned information (a) and (b) is as follows.

The throttle upper limit opening THh is set such that the larger the current actual vehicle speed V, the larger the throttle upper limit opening value, and on the other hand, the throttle upper limit opening THh is set such that the larger the road gradient I, the larger the throttle upper limit opening value.

In addition, the throttle upper limit opening may be corrected based on a deviation of the actual vehicle speed from the target vehicle speed, acceleration, actual fuel efficiency, or the like, as necessary.

In determining the throttle upper limit opening THh in this manner, the throttle upper limit opening THh can be more finely set with respect to a variation in load by making the road gradient I a factor.

On the other hand, in a case where the determination result in the step S101 is "YES", it proceeds to step S103. Then, the throttle upper limit openings THh1, THh2, THh3, and THh4 of the CC eco-modes 1, 2, 3, and 4 at the time of the fuel-efficient mode are set with reference to a throttle upper limit opening map for the fuel-efficient mode (not shown) based on the above-mentioned running information (a) and (b) at present time. In addition, also in the case of the fuel-efficient mode, a correlation between the throttle upper limit opening THh and the above-mentioned information (a) and (b) is the same as the case of the normal mode. Also, the magnitude relation of the throttle upper limit openings THh is also set to be the relationship of THh1<THh2<THh3<THh4 similarly to the normal mode.

In this manner, the driver can select any one of driving force control which is subjected to restriction of the throttle upper limit opening in the normal mode and driving force control which is subjected to restriction of the throttle upper limit opening in the fuel-efficient mode, by an operation of the fuel-efficient mode change-over switch 11.

After proceeding from the step S102 or S103 to step S104, it is determined whether or not the present CC eco-mode is less than or equal to 1.

In a case where the determination result in the step S104 is "YES" (CC eco-mode≦1), it proceeds to step S105. Then, the smaller opening out of the throttle upper limit opening THh1 of the CC eco-mode 1 and the provisional target throttle opening calculated in the step S03 is set to be the target throttle opening.

On the other hand, in a case where the determination result in the step S104 is "NO" (CC eco-mode>1), after it proceeds to step S106, it is determined whether or not the present CC eco-mode is 2.

In a case where the determination result in the step S106 is "YES" (CC eco-mode=2), it proceeds to step S107. Then, the smaller opening out of the throttle upper limit opening THh2 of the CC eco-mode 2 and the provisional target throttle opening calculated in the step S03 is set to be the target throttle opening.

On the other hand, in a case where the determination result in the step S106 is "NO" (CC eco-mode≠2), after it proceeds to step S108, it is determined whether or not the present CC eco-mode is 3.

In a case where the determination result in the step S108 is "YES" (CC eco-mode=3), it proceeds to step S109. Then, the smaller opening out of the throttle upper limit opening THh3 of the CC eco-mode 3 and the provisional target throttle opening calculated in the step S03 is set to be the target throttle opening.

On the other hand, in a case where the determination result in the step S108 is "NO" (CC eco-mode≠3), after it proceeds to step S110, it is determined whether or not the present CC eco-mode is 4.

In a case where the determination result in the step S110 is "YES" (CC eco-mode=4), it proceeds to step S111. Then, after the smaller opening out of the throttle upper limit opening THh4 of the CC eco-mode 4 and the provisional target throttle opening calculated in the step S03 is set to be the target throttle opening, execution of this routine is temporarily ended.

On the other hand, when the determination result in the step S110 is "NO" (CC eco-mode≠4), it proceeds to step S112. Then, after the throttle upper limit opening THh is set to be the fully open value, execution of this routine is temporarily ended. In other words, restriction is not provided to the throttle opening.

Mode Determination Processing

Next, the mode determination processing which is executed in the step S200 will be described in accordance with the flow charts of FIGS. 5 to 9.

Figure 5:
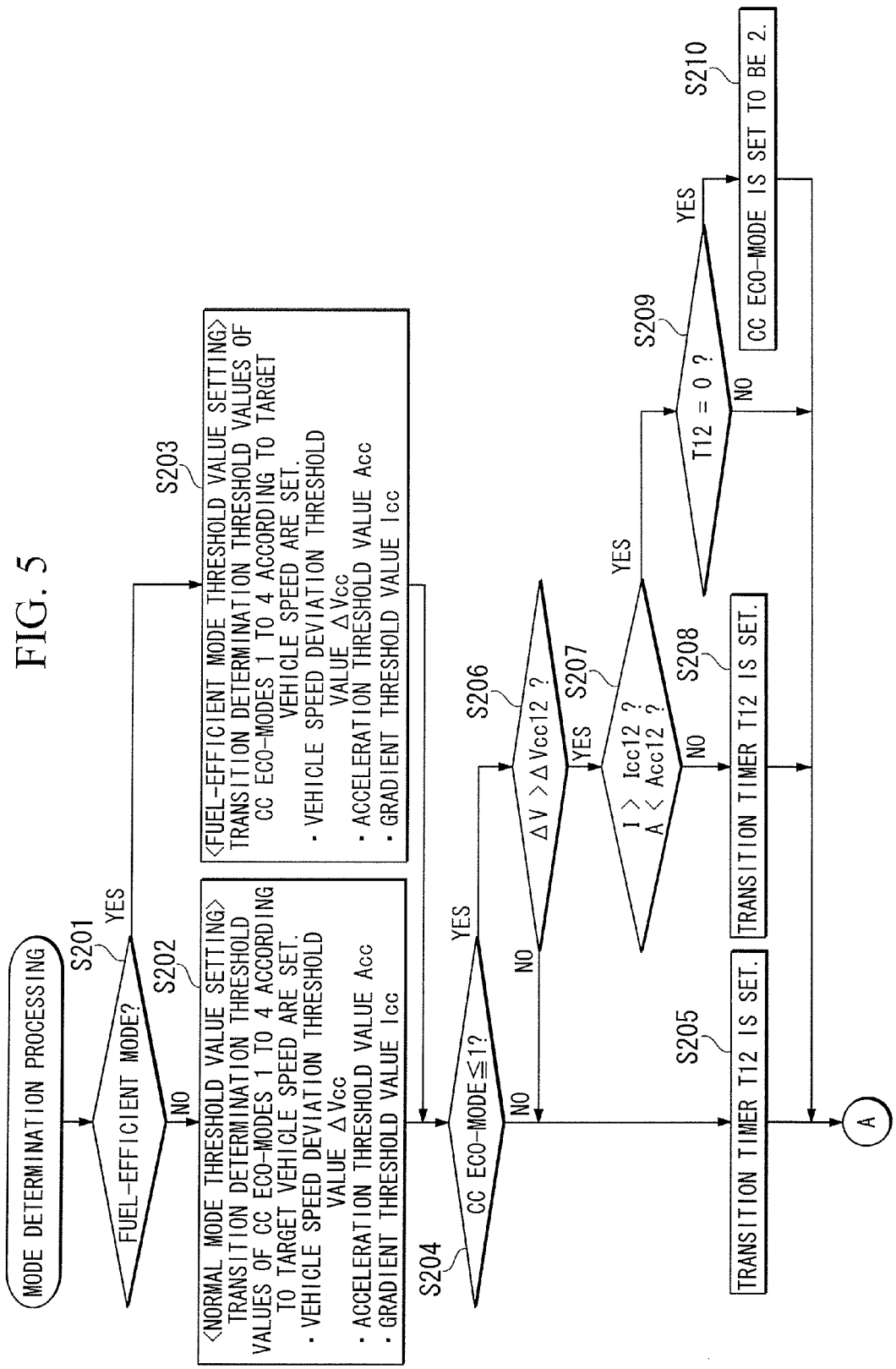
FIG. 5 is a flow chart (1) showing a mode determination processing at the time of the cruise control of the running control device for a vehicle according to the embodiment.

As shown in FIG. 5, first, in step S201, it is determined whether or not the fuel-efficient mode is selected.

In a case where the determination result in the step S201 is "NO", it proceeds to step S202. Then, transition determination threshold values (f) to (h) at the time of the normal mode are set with reference to the respective threshold value maps for the normal mode (not shown) based on the target vehicle speed which is set at present.

(f) Vehicle Speed Deviation Threshold Value $\Delta Vcc$ ($\Delta Vcc12$, $\Delta Vcc23$, $\Delta Vcc34$, $\Delta Vcc45$, $\Delta Vcc54$, $\Delta Vcc43$, $\Delta Vcc32$, and $\Delta Vcc21$)

(g) Acceleration Threshold Value Acc (Acc12, Acc23, Acc34, Acc45, Acc54, Acc43, Acc32, and Acc21)

(h) Gradient Threshold Value Icc (Icc12, Icc23, Icc34, Icc45, Icc54, Icc43, Icc32, and Icc21)

In addition, in this embodiment, setting of the vehicle speed deviation threshold value $\Delta Vcc$ is performed based on the target vehicle speed and the gradient of a road where the vehicle is running at present and on the other hand, the vehicle speed deviation threshold value $\Delta Vcc$ is set such that the larger the road gradient I becomes, the larger the vehicle speed deviation threshold value. This is because in a case where the driver operates acceleration and deceleration and performs running, the larger the gradient and the larger the vehicle speed lowering amount becomes. For this reason, the vehicle speed deviation threshold value $\Delta Vcc$ is set such that the larger the road gradient I becomes, the larger the vehicle speed deviation threshold value. Accordingly, control without making the driver feel a sense of discomfort can be realized.

On the other hand, in a case where the vehicle speed deviation threshold value $\Delta Vcc$ is set to be a small value when the gradient is large, the cruise control makes the actual vehicle speed V be within the small vehicle speed deviation threshold value $\Delta Vcc$. For this reason, the target throttle opening becomes large. Accordingly, in this case, since a driving output becomes large, fuel efficiency deteriorates.

In addition, numerals attached to the threshold value sign indicate transition grades of the CC eco-modes. Also, the threshold value sign with attachment numerals means a determination threshold value of whether or not transition from the CC eco-mode of a grade that is indicated by the first numeral to the CC eco-mode of a grade that is indicated by the second numeral should be permitted. For example, the vehicle speed deviation threshold value $\Delta Vcc12$ is a vehicle speed deviation threshold value when determining whether or not transition from the CC eco-mode 1 to the CC eco-mode 2 should be permitted. Similarly, the vehicle speed deviation threshold value $\Delta Vcc21$ is a vehicle speed deviation threshold value when determining whether or not transition from the CC eco-mode 2 to the CC eco-mode 1 should be permitted. The acceleration threshold value Acc and the gradient threshold value Icc are also the same.

Also, a magnitude relation between the respective transition determination threshold values is set as follows.

Vehicle Speed Deviation Threshold Value
$\Delta Vcc21 \leq \Delta Vcc32 \leq \Delta Vcc43 \leq \Delta Vcc54$
$\Delta Vcc12 \leq \Delta Vcc23 \leq \Delta Vcc34 \leq \Delta Vcc45$
Acceleration Threshold Value
$Acc21 \geq Acc32 \geq Acc43 \geq Acc54$
$Acc12 \geq Acc23 \geq Acc34 \geq Acc45$
Gradient Threshold Value
$Icc21 \leq Icc32 \leq Icc43 \leq Icc54$
$Icc12 \leq Icc23 \leq Icc34 \leq Icc45$ In addition, the transition determination threshold values of the CC eco-modes may be corrected based on actual fuel efficiency or the like, as necessary.

On the other hand, in a case where the determination result in the step S201 is "YES", it proceeds to step S203. Then, each of the above-mentioned transition determination threshold value (f) to (h) at the time of the fuel-efficient mode is set with reference to each threshold value map for the fuel-efficient mode (not shown) based on the target vehicle speed which is set at present.

After proceeding from the step S202 or S203 to step S204, it is determined whether or not the present CC eco-mode is less than or equal to 1.

In a case where the determination result in the step S204 is "NO" (CC eco-mode>1), since the mode is any one of the CC eco-modes 2 to 5, after it proceeds to step S205, a transition timer T12 is set to be the initial value. Then, it proceeds to step S211 (refer to FIG. 6). Here, the transition timer T12 is a timer which measures a time (hereinafter referred to as a transition determination time) required to determine whether or not the transition from the CC eco-mode 1 to the CC eco-mode 2 should be permitted. This timer is a countdown timer which subtracts an elapsed time from an initial value.

On the other hand, in a case where the determination result in the step S204 is "YES" (CC eco-mode$\leq$1), since the mode is the CC eco-mode 1, it proceeds to step S206. Then, it is determined whether or not the vehicle speed deviation $\Delta V$ of the current actual vehicle speed V from the target vehicle speed is greater than the determination threshold value (that is, the vehicle speed deviation threshold value $\Delta Vcc12$) of whether or not the transition from the CC eco-mode 1 to the CC eco-mode 2 should be permitted set in the steps S202 and S203.

In a case where the determination result in the step S206 is "NO" ($\Delta V \leq \Delta Vcc12$), since the CC eco-mode 1 should be maintained, it proceeds to the step S205. Then, the transition timer T12 is set to be the initial value.

In a case where the determination result in the step S206 is "YES" ($\Delta V > \Delta Vcc12$), it proceeds to step S207. Then, it is determined whether or not the road gradient and the acceleration satisfy conditions which permit the transition from the CC eco-mode 1 to the CC eco-mode 2. Specifically, it is determined whether or not the road gradient I during the current running is larger than the determination threshold value (that is, the gradient threshold value Icc12) of whether or not the transition from the CC eco-mode 1 to the CC eco-mode 2 should be permitted set in the steps S202 and S203, and the present acceleration A is smaller than the determination threshold value (that is, the acceleration threshold value Acc12) of whether or not the transition from the CC eco-mode 1 to the CC eco-mode 2 should be permitted set in the steps S202 and S203.

In a case where the determination result in the step S207 is "NO" (at least one of I>Icc12 and A<Acc12 is not established), since the CC eco-mode 1 should be maintained, it proceeds to step S208. Then, the transition timer T12 is set to be the initial value.

On the other hand, in a case where the determination result in the step S207 is "YES" (I>Icc12 and A<Acc12), after it proceeds to step S209, it is determined whether or not the transition timer T12 is 0.

In a case where the determination result in the step S209 is "YES" (T12=0), after it proceeds to step S210, the CC eco-mode is set to be 2. That is, the transition from the CC eco-mode 1 to the CC eco-mode 2 is performed. Then, it proceeds from the step S210 to the step S211. On the other hand, in a case where the determination result in the step S209 is "NO" (T12$\neq$0), it proceeds to the step S211 without executing the processing of the step S210.

That is, when a state where all of the vehicle speed deviation condition $\Delta V > \Delta Vcc12$, the gradient condition I>Icc12, and the acceleration condition A<Acc12 are satisfied is continued for a predetermined time (the time corresponding to the initial value set in the transition timer T12), the transition from the CC eco-mode 1 to the CC eco-mode 2 is performed. On the other hand, even if all of the three conditions are satisfied, since the CC eco-mode 1 is maintained until the predetermined time elapses, the transition to the CC eco-mode 2 is not performed. As a result, when the load instantaneously increases due to unevenness or the like of the road surface, or the like, the transition of the CC eco-mode to the upper grade can be blocked. Accordingly, since it is not necessary to increase the throttle upper limit opening THh, it contributes to improvement in fuel efficiency.

Figure 6:
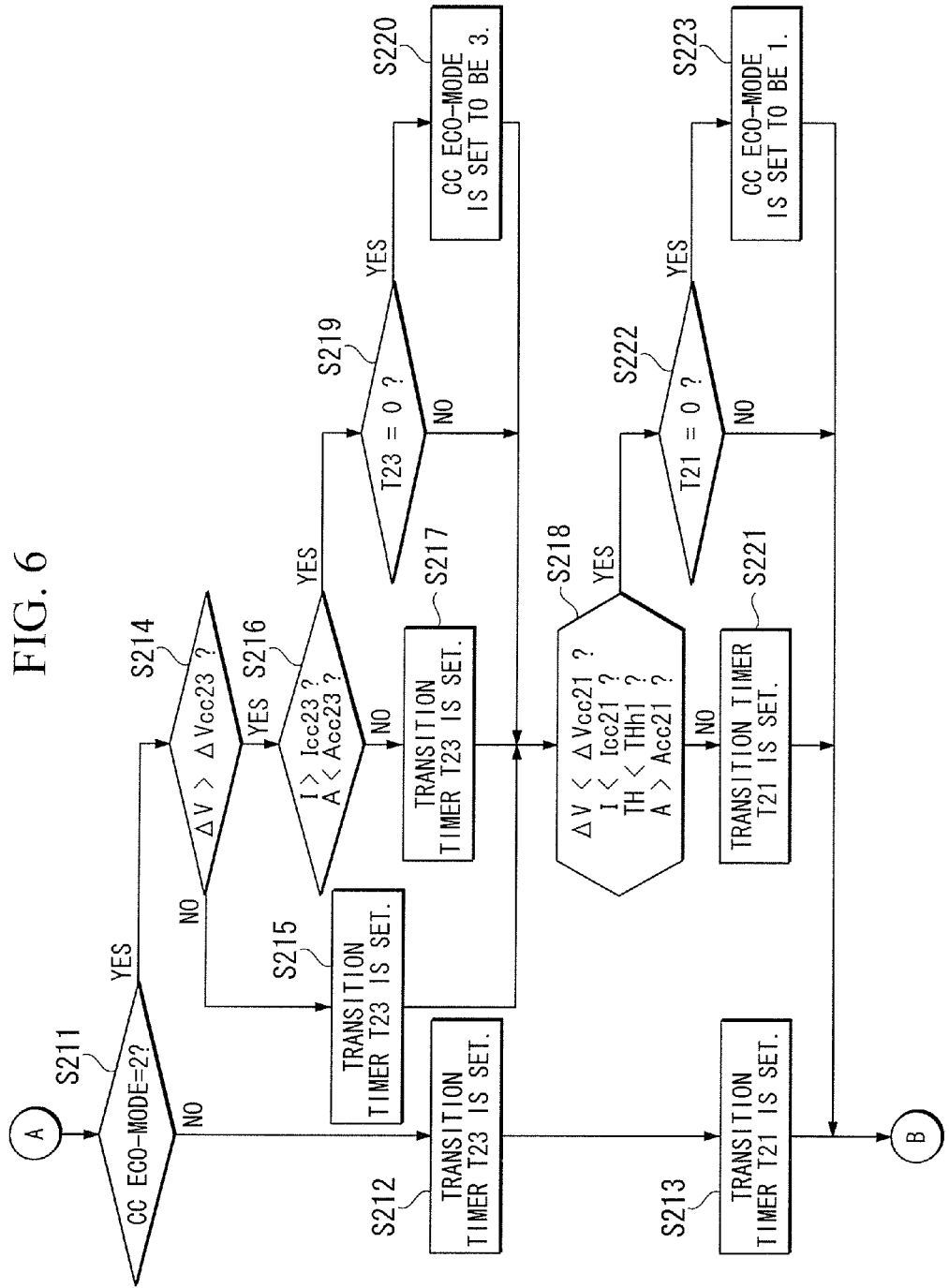
FIG. 6 is a flow chart (2) showing a continued processing of the mode determination processing.

Next, as shown in FIG. 6, in the step S211, it is determined whether or not the present mode is the CC eco-mode 2.

In a case where the determination result in the step S211 is "NO" (CC eco-mode$\neq$2), since the mode is any one of the CC eco-modes 1, 3, 4, and 5, it proceeds to step S212. Then, after a transition timer T23 is set to be the initial value, it proceeds to step S213. Then, after a transition timer T21 is set to be the initial value, it proceeds to step S224 (refer to FIG. 7). Here, the transition timer T23 is a timer which measures a transition determination time from the CC eco-mode 2 to the CC eco-mode 3. Also, the transition timer T21 is a timer which measures a transition determination time from the CC eco-mode 2 to the CC eco-mode 1. All of these timers are countdown timers which subtract an elapsed time from an initial value.

On the other hand, in a case where the determination result in the step S211 is "YES" (CC eco-mode=2), since the mode is the CC eco-mode 2, it proceeds to step S214. Then, it is determined whether or not the present vehicle speed deviation ΔV is larger than the determination threshold value (that is, the vehicle speed deviation threshold value ΔVcc23) of whether or not the transition from the CC eco-mode 2 to the CC eco-mode 3 should be permitted set in the steps S202 and S203.

In a case where the determination result in the step S214 is "NO" (ΔV≦ΔVcc23), since the transition to the CC eco-mode 3 should not be performed, it proceeds to step S215. Then, after the transition timer T23 is set to be the initial value, it proceeds to step S218.

In a case where the determination result in the step S214 is "YES" (ΔV>ΔVcc23), it proceeds to step S216. Then, it is determined whether or not the road gradient and the acceleration satisfy conditions which permit the transition from the CC eco-mode 2 to the CC eco-mode 3. Specifically, it is determined whether or not the road gradient I during the current running is larger than the determination threshold value (that is, the gradient threshold value Icc23) of whether or not the transition from the CC eco-mode 2 to the CC eco-mode 3 should be permitted set in the steps S202 and S203, and the present acceleration A is smaller than the determination threshold value (that is, the acceleration threshold value Acc23) of whether or not the transition from the CC eco-mode 2 to the CC eco-mode 3 should be permitted set in the steps S202 and S203.

In a case where the determination result in the step S216 is "NO" (at least one of I>Icc23 and A<Acc23 is not established), since the transition to the CC eco-mode 3 should not be performed, it proceeds to step S217. Then, after the transition timer T23 is set to be the initial value, it proceeds to the step S218.

On the other hand, in a case where the determination result in the step S216 is "YES" (I>Icc23 and A<Acc23), after it proceeds to step S219, it is determined whether or not the transition timer T23 is 0.

In a case where the determination result in the step S219 is "YES" (T23=0), after it proceeds to step S220, the CC eco-mode is set to be 3. That is, the transition from the CC eco-mode 2 to the CC eco-mode 3 is performed. Then, it proceeds from the step S220 to the step S218. On the other hand, in a case where the determination result in the step S219 is "NO" (T23≠0), it proceeds to the step S218 without executing the processing of the step S220.

That is, when a state where all of the vehicle speed deviation condition ΔV>ΔVcc23, the gradient condition I>Icc23, and the acceleration condition A<Acc23 are satisfied is continued for a predetermined time (the time corresponding to the initial value set in the transition timer T23), the transition from the CC eco-mode 2 to the CC eco-mode 3 is performed. On the other hand, even if all of the three conditions are satisfied, since the CC eco-mode 2 is maintained until the predetermined time elapses, the transition to the CC eco-mode 3 is not performed. As a result, when the load instantaneously increases due to unevenness or the like of the road surface, or the like, the transition of the CC eco-mode to the upper grade can be blocked. Accordingly, since it is not necessary to increase the throttle upper limit opening THh, it contributes to improvement in fuel efficiency.

Next, in the step S218, it is determined whether or not the vehicle speed deviation, the road gradient, the throttle opening, and the acceleration satisfy conditions which permit the transition from the CC eco-mode 2 to the CC eco-mode 1. Specifically, it is determined whether or not the present vehicle speed deviation ΔV is smaller than the determination threshold value (that is, the vehicle speed deviation threshold value ΔVcc21) of whether or not the transition from the CC eco-mode 2 to the CC eco-mode 1 should be permitted set in the steps S202 and S203, the road gradient I during the current running is smaller than the determination threshold value (that is, the gradient threshold value Icc21) of whether or not the transition from the CC eco-mode 2 to the CC eco-mode 1 should be permitted set in the steps S202 and S203, the present throttle opening TH is smaller than the throttle upper limit opening THh1 of the CC eco-mode 1 set in the steps S102 and S103 of the throttle upper limit opening determination processing, and the present acceleration A is larger than the determination threshold value (that is, the acceleration threshold value Acc21) of whether or not the transition from the CC eco-mode 2 to the CC eco-mode 1 should be permitted set in the steps S202 and S203.

In a case where the determination result in the step S218 is "NO" (at least one of ΔV<ΔVcc21, I<Icc21, TH<THh1, and A>Acc21 is not established), since the transition to the CC eco-mode 1 should not be performed, it proceeds to step S221. Then, after the transition timer T21 is set to be the initial value, it proceeds to the step S224.

On the other hand, in a case where the determination result in the step S218 is "YES" (all of ΔV<ΔVcc21, I<Icc21, TH<THh1, and A>Acc21 are established), after it proceeds to step S222, it is determined whether or not the transition timer T21 is 0.

In a case where the determination result in the step S222 is "YES" (T21=0), after it proceeds to step S223, the CC eco-mode is set to be 1. That is, the transition from the CC eco-mode 2 to the CC eco-mode 1 is performed. Then, it proceeds from the step S223 to the step S224. On the other hand, in a case where the determination result in the step S222 is "NO" (T21≠0), it proceeds to the step S224 without executing the processing of the step S223.

That is, when a state where all of the vehicle speed deviation condition ΔV<ΔVcc21, the gradient condition I<Icc21, the throttle opening condition TH<THh1, and the acceleration condition A>Acc21 are satisfied for a predetermined time (the time corresponding to the initial value set in the transition timer T21), the transition from the CC eco-mode 2 to the CC eco-mode 1 is performed. On the other hand, even if all of the four conditions are satisfied, since the CC eco-mode 2 is maintained until the predetermined time elapses, the transition to the CC eco-mode 1 is not performed. Accordingly, when the load instantaneously decreases due to unevenness or the like of the road surface, or the like, the complicated transition to another CC eco-mode can be prevented.

Figure 7:
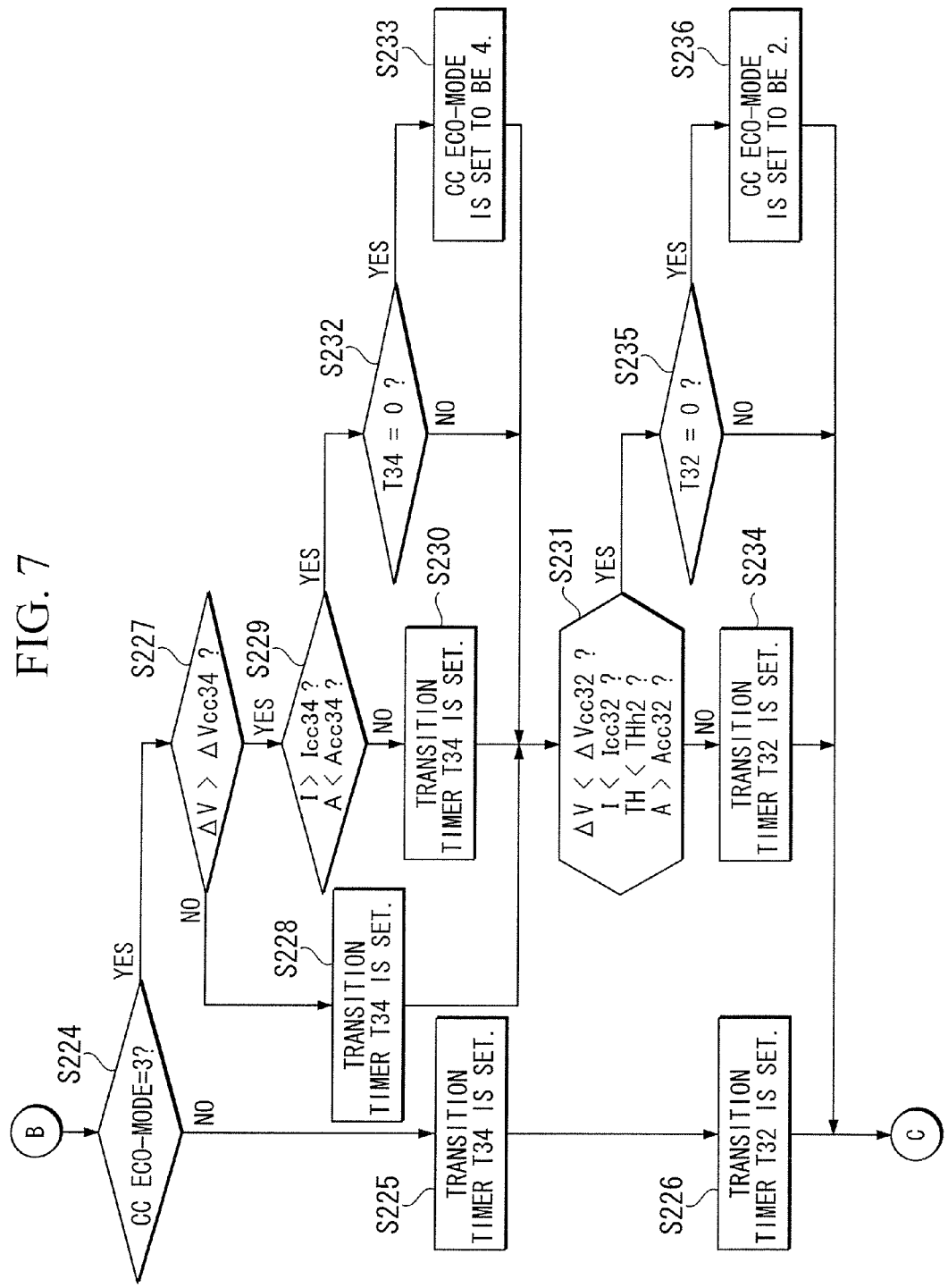
FIG. 7 is a flow chart (3) showing a continued processing of the mode determination processing.

Next, as shown in FIG. 7, in the step S224, it is determined whether or not the present mode is the CC eco-mode 3.

In a case where the determination result in the step S224 is "NO" (CC eco-mode≠3), since the mode is any one of the CC eco-modes 1, 2, 4, and 5, it proceeds to step S225. Then, after a transition timer T34 is set to be the initial value, it proceeds to step S226. Then, after a transition timer T32 is set to be the initial value, it proceeds to step S237 (refer to FIG. 8). Here, the transition timer T34 is a timer which measures a transition determination time from the CC eco-mode 3 to the CC eco-mode 4. Also, the transition timer T32 is a timer which measures a transition determination time from the CC eco-mode 3 to the CC eco-mode 2. All of these timers are countdown timers which subtract an elapsed time from an initial value.

On the other hand, in a case where the determination result in the step S224 is "YES" (CC eco-mode=3), since the mode is the CC eco-mode 3, it proceeds to step S227. Then, it is determined whether or not the present vehicle speed deviation $\Delta V$ is larger than the determination threshold value (that is, the vehicle speed deviation threshold value $\Delta Vcc34$) of whether or not the transition from the CC eco-mode 3 to the CC eco-mode 4 should be permitted set in the steps S202 and S203.

In a case where the determination result in the step S227 is "NO" ($\Delta V \leq \Delta Vcc34$), since the transition to the CC eco-mode 4 should not be performed, it proceeds to step S228. Then, after the transition timer T34 is set to be the initial value, it proceeds to step S231.

In a case where the determination result in the step S227 is "YES" ($\Delta V > \Delta Vcc34$), it proceeds to step S229. Then, it is determined whether or not the road gradient and the acceleration satisfy conditions which permit the transition from the CC eco-mode 3 to the CC eco-mode 4. Specifically, it is determined whether or not the road gradient I during the current running is larger than the determination threshold value (that is, the gradient threshold value Icc34) of whether or not the transition from the CC eco-mode 3 to the CC eco-mode 4 should be permitted set in the steps S202 and S203, and the present acceleration A is smaller than the determination threshold value (that is, the acceleration threshold value Acc34) of whether or not the transition from the CC eco-mode 3 to the CC eco-mode 4 should be permitted set in the steps S202 and S203.

In a case where the determination result in the step S229 is "NO" (at least one of I>Icc34 and A<Acc34 is not established), since the transition to the CC eco-mode 4 should not be performed, it proceeds to step S230. Then, after the transition timer T34 is set to be the initial value, it proceeds to the step S231.

On the other hand, in a case where the determination result in the step S229 is "YES" (I>Icc34 and A<Acc34), after it proceeds to step S232, it is determined whether or not the transition timer T34 is 0.

In a case where the determination result in the step S232 is "YES" (T34=0), after it proceeds to step S233, the CC eco-mode is set to be 4. That is, the transition from the CC eco-mode 3 to the CC eco-mode 4 is performed. Then, it proceeds from the step S233 to the step S231. On the other hand, in a case where the determination result in the step S232 is "NO" (T34≠0), it proceeds to the step S231 without executing the processing of the step S233.

That is, when a state where all of the vehicle speed deviation condition $\Delta V > \Delta Vcc34$, the gradient condition I>Icc34, and the acceleration condition A<Acc34 are satisfied is continued for a predetermined time (the time corresponding to the initial value set in the transition timer T34), the transition from the CC eco-mode 3 to the CC eco-mode 4 is performed. On the other hand, even if all of the three conditions are satisfied, since the CC eco-mode 3 is maintained until the predetermined time elapses, the transition to the CC eco-mode 4 is not performed. As a result, when the load instantaneously increases due to unevenness or the like of the road surface, or the like, the transition of the CC eco-mode to the upper grade can be blocked. Accordingly, since it is not necessary to increase the throttle upper limit opening THh, it contributes to improvement in fuel efficiency.

Next, in the step S231, it is determined whether or not the vehicle speed deviation, the road gradient, the throttle opening, and the acceleration satisfy conditions which permit the transition from the CC eco-mode 3 to the CC eco-mode 2. Specifically, it is determined whether or not the present vehicle speed deviation $\Delta V$ is smaller than the determination threshold value (that is, the vehicle speed deviation threshold value $\Delta Vcc32$) of whether or not the transition from the CC eco-mode 3 to the CC eco-mode 2 should be permitted set in the steps S202 and S203, the road gradient I during the current running is smaller than the determination threshold value (that is, the gradient threshold value Icc32) of whether or not the transition from the CC eco-mode 3 to the CC eco-mode 2 should be permitted set in the steps S202 and S203, the present throttle opening TH is smaller than the throttle upper limit opening THh2 of the CC eco-mode 2 set in the steps S102 and S103 of the throttle upper limit opening determination processing, and the present acceleration A is larger than the determination threshold value (that is, the acceleration threshold value Acc32) of whether or not the transition from the CC eco-mode 3 to the CC eco-mode 2 should be permitted set in the steps S202 and S203.

In a case where the determination result in the step S231 is "NO" (at least one of $\Delta V < \Delta Vcc32$, I<Icc32, TH<THh2, and A>Acc32 is not established), since the transition to the CC eco-mode 2 should not be performed, it proceeds to step S234. Then, after the transition timer T32 is set to be the initial value, it proceeds to the step S237.

On the other hand, in a case where the determination result in the step S231 is "YES" (all of $\Delta V < \Delta Vcc32$, I<Icc32, TH<THh2, and A>Acc32 are established), after it proceeds to step S235, it is determined whether or not the transition timer T32 is 0.

In a case where the determination result in the step S235 is "YES" (T32=0), after it proceeds to step S236, the CC eco-mode is set to be 2. That is, the transition from the CC eco-mode 3 to the CC eco-mode 2 is performed. Then, it proceeds from the step S236 to the step S237. On the other hand, in a case where the determination result in the step S235 is "NO" (T32≠0), it proceeds to the step S237 without executing the processing of the step S236.

That is, when a state where all of the vehicle speed deviation condition $\Delta V < \Delta Vcc32$, the gradient condition I<Icc32, the throttle opening condition TH<THh2, and the acceleration condition A>Acc32 are satisfied is continued for a predetermined time (the time corresponding to the initial value set in the transition timer T32), the transition from the CC eco-mode 3 to the CC eco-mode 2 is performed. On the other hand, even if all of the four conditions are satisfied, since the CC eco-mode 3 is maintained until the predetermined time elapses, the transition to the CC eco-mode 2 is not performed. Accordingly, when the load instantaneously decreases due to unevenness or the like of the road surface, or the like, the complicated transition to another CC eco-mode can be prevented.

Figure 8:
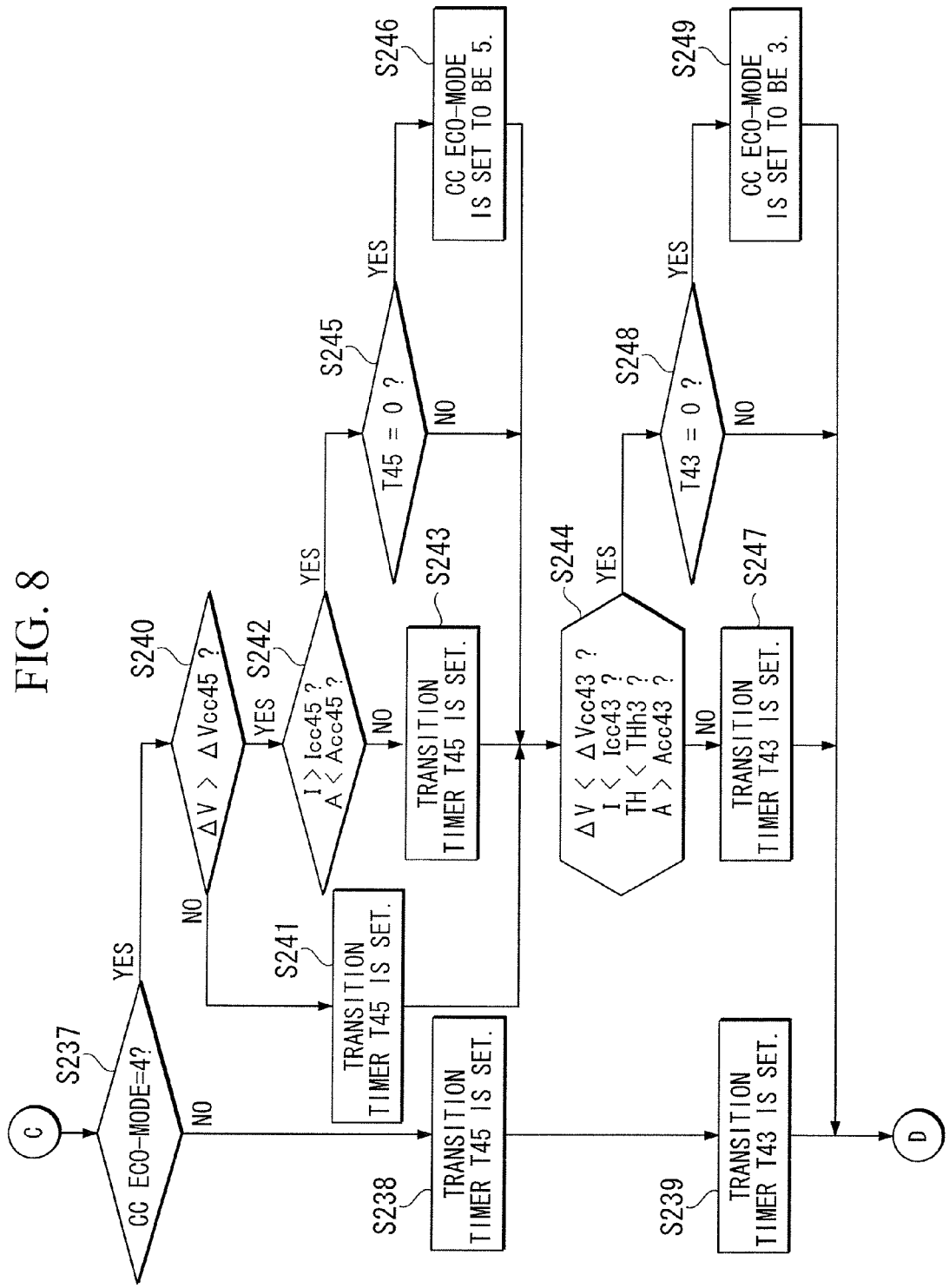
FIG. 8 is a flow chart (4) showing a continued processing of the mode determination processing.

Next, as shown in FIG. 8, in the step S237, it is determined whether or not the present mode is the CC eco-mode 4.

In a case where the determination result in the step S237 is "NO" (CC eco-mode≠4), since the mode is any one of the CC eco-modes 1, 2, 3, and 5, it proceeds to step S238. Then, after a transition timer T45 is set to be the initial value, it proceeds to step S239. Then, after a transition timer T43 is set to be the initial value, it proceeds to step S250 (refer to FIG. 8). Here, the transition timer T45 is a timer which measures a transition determination time from the CC eco-mode 4 to the CC eco-mode 5. Also, the transition timer T43 is a timer which measures a transition determination time from the CC eco-mode 4 to the CC eco-mode 3. All of these timers are countdown timers which subtract an elapsed time from an initial value.

On the other hand, in a case where the determination result in the step S237 is "YES" (CC eco-mode=4), since the mode is the CC eco-mode 4, it proceeds to step S240. Then, it is determined whether or not the present vehicle speed deviation ΔV is larger than the determination threshold value (that is, the vehicle speed deviation threshold value ΔVcc45) of whether or not the transition from the CC eco-mode 4 to the CC eco-mode 5 should be permitted set in the steps S202 and S203.

In a case where the determination result in the step S240 is "NO" (ΔV<ΔVcc45), since the transition to the CC eco-mode 5 should not be performed, it proceeds to step S241. Then, after the transition timer T45 is set to be the initial value, it proceeds to step S244.

In a case where the determination result in the step S240 is "YES" (ΔV>ΔVcc45), it proceeds to step S242. Then, it is determined whether or not the road gradient and the acceleration satisfy conditions which permit the transition from the CC eco-mode 4 to the CC eco-mode 5. Specifically, it is determined whether or not the road gradient I during the current running is larger than the determination threshold value (that is, the gradient threshold value Icc45) of whether or not the transition from the CC eco-mode 4 to the CC eco-mode 5 should be permitted set in the steps S202 and S203, and the present acceleration A is smaller than the determination threshold value (that is, the acceleration threshold value Acc45) of whether or not the transition from the CC eco-mode 4 to the CC eco-mode 5 should be permitted set in the steps S202 and S203.

In a case where the determination result in the step S242 is "NO" (at least one of I>Icc45 and A<Acc45 is not established), since the transition to the CC eco-mode 5 should not be performed, it proceeds to step S243. Then, after the transition timer T45 is set to be the initial value, it proceeds to the step S244.

On the other hand, in a case where the determination result in the step S242 is "YES" (I>Icc45 and A<Acc45), after it proceeds to step S245, it is determined whether or not the transition timer T45 is 0.

In a case where the determination result in the step S245 is "YES" (T45=0), after it proceeds to step S246, the CC eco-mode is set to be 5. That is, the transition from the CC eco-mode 4 to the CC eco-mode 5 is performed. Then, it proceeds from the step S246 to the step S244. On the other hand, in a case where the determination result in the step S245 is "NO" (T45≠0), it proceeds to the step S244 without executing the processing of the step S246.

That is, when a state where all of the vehicle speed deviation condition ΔV>ΔVcc45, the gradient condition I>Icc45, and the acceleration condition A<Acc45 are satisfied is continued for a predetermined time (the time corresponding to the initial value set in the transition timer T45), the transition from the CC eco-mode 4 to the CC eco-mode 5 is performed. On the other hand, even if all of the three conditions are satisfied, since the CC eco-mode 4 is maintained until the predetermined time elapses, the transition to the CC eco-mode 5 is not performed. As a result, when the load instantaneously increases due to unevenness or the like of the road surface, or the like, the transition of the CC eco-mode to the upper grade can be blocked. Accordingly, since it is not necessary to increase the throttle upper limit opening THh, it contributes to improvement in fuel efficiency.

Next, in the step S244, it is determined whether or not the vehicle speed deviation, the road gradient, the throttle opening, and the acceleration satisfy conditions which permit the transition from the CC eco-mode 4 to the CC eco-mode 3. Specifically, it is determined whether or not the present vehicle speed deviation ΔV is smaller than the determination threshold value (that is, the vehicle speed deviation threshold value ΔVcc43) of whether or not the transition from the CC eco-mode 4 to the CC eco-mode 3 should be permitted set in the steps S202 and S203, the road gradient I during the current running is smaller than the determination threshold value (that is, the gradient threshold value Icc43) of whether or not the transition from the CC eco-mode 4 to the CC eco-mode 3 should be permitted set in the steps S202 and S203, the present throttle opening TH is smaller than the throttle upper limit opening THh3 of the CC eco-mode 3 set in the steps S102 and S103 of the throttle upper limit opening determination processing, and the present acceleration A is larger than the determination threshold value (that is, the acceleration threshold value Acc43) of whether or not the transition from the CC eco-mode 4 to the CC eco-mode 3 should be permitted set in the steps S202 and S203.

In a case where the determination result in the step S244 is "NO" (at least one of ΔV<ΔVcc43, I<Icc43, TH<THh3, and A>Acc43 is not established), since the transition to the CC eco-mode 3 should not be performed, it proceeds to step S247. Then, after the transition timer T43 is set to be the initial value, it proceeds to the step S250.

On the other hand, in a case where the determination result in the step S244 is "YES" (all of ΔV<ΔVcc43, I<Icc43, TH<THh3, and A>Acc43 are established), after it proceeds to step S248, it is determined whether or not the transition timer T43 is 0.

In a case where the determination result in the step S248 is "YES" (T43=0), after it proceeds to step S249, the CC eco-mode is set to be 3. That is, the transition from the CC eco-mode 4 to the CC eco-mode 3 is performed. Then, it proceeds from the step S249 to the step S250. On the other hand, in a case where the determination result in the step S248 is "NO" (T43≠0), it proceeds to the step S250 without executing the processing of the step S249.

That is, when a state where all of the vehicle speed deviation condition ΔV<ΔVcc43, the gradient condition I<Icc43, the throttle opening condition TH<THh3, and the acceleration condition A>Acc43 are satisfied is continued for a predetermined time (the time corresponding to the initial value set in the transition timer T43), the transition from the CC eco-mode 4 to the CC eco-mode 3 is performed. On the other hand, even if all of the four conditions are satisfied, since the CC eco-mode 4 is maintained until the predetermined time elapses, the transition to the CC eco-mode 3 is not performed. Accordingly, when the load instantaneously decreases due to unevenness or the like of the road surface, or the like, the complicated transition to another CC eco-mode can be prevented.

Figure 9:
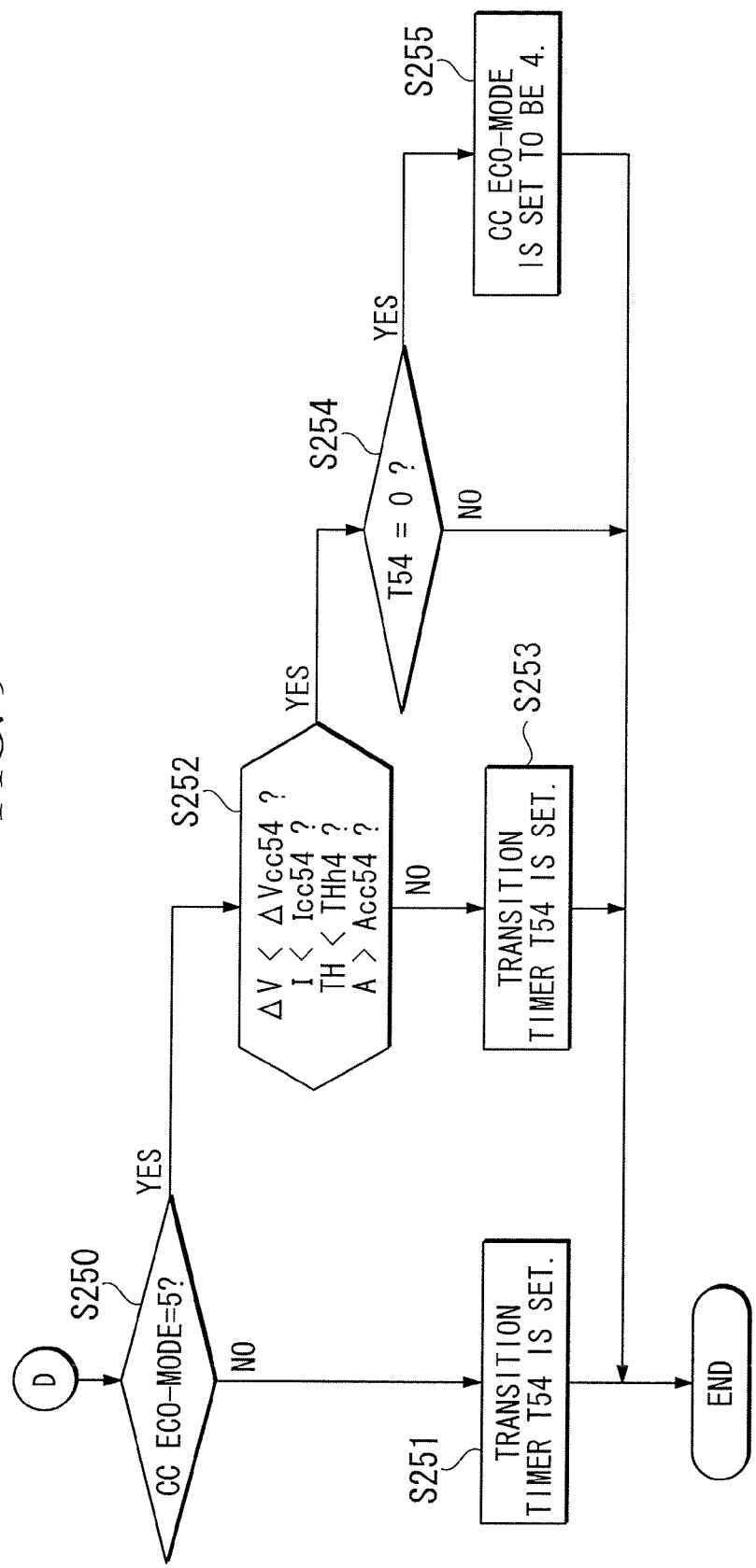
FIG. 9 is a flow chart (5) showing a continued processing of the mode determination processing.

Next, as shown in FIG. 9, in the step S250, it is determined whether or not the present mode is the CC eco-mode 5.

In a case where the determination result in the step S250 is "NO" (CC eco-mode≠5), since the mode is any one of the CC eco-modes 1, 2, 3, and 4, it proceeds to step S251. Then, a transition timer T54 is set to be the initial value, and execution of this routine is temporarily ended. Here, the transition timer T54 is a timer which measures a transition determination time from the CC eco-mode 5 to the CC eco-mode 4. This timer is a countdown timer which subtracts an elapsed time from an initial value.

In a case where the determination result in the step S250 is "YES" (CC eco-mode=5), since the mode is the CC eco-mode 5, it proceeds to step S252. Then, it is determined whether or not the vehicle speed deviation, the road gradient, the throttle opening, and the acceleration satisfy conditions which permit the transition from the CC eco-mode 5 to the CC eco-mode 4. Specifically, it is determined whether or not the present vehicle speed deviation $\Delta V$ is smaller than the determination threshold value (that is, the vehicle speed deviation threshold value $\Delta Vcc54$) of whether or not the transition from the CC eco-mode 5 to the CC eco-mode 4 should be permitted set in the steps S202 and S203, the road gradient I during the current running is smaller than the determination threshold value (that is, the gradient threshold value Icc54) of whether or not the transition from the CC eco-mode 5 to the CC eco-mode 4 should be permitted set in the steps S202 and S203, the present throttle opening TH is smaller than the throttle upper limit opening THh4 of the CC eco-mode 4 set in the steps S102 and S103 of the throttle upper limit opening determination processing, and the present acceleration A is larger than the determination threshold value (that is, the acceleration threshold value Acc54) of whether or not the transition from the CC eco-mode 5 to the CC eco-mode 4 should be permitted set in the steps S202 and S203.

In a case where the determination result in the step S252 is "NO" (at least one of $\Delta V<\Delta Vcc54$, $I<Icc54$, $TH<THh4$, and $A>Acc54$ is not established), since the transition to the CC eco-mode 4 should not be performed, it proceeds to step S253. Then, after the transition timer T54 is set to be the initial value, execution of this routine is temporarily ended.

On the other hand, in a case where the determination result in the step S252 is "YES" (all of $\Delta V<\Delta Vcc54$, $I<Icc54$, $TH<THh4$, and $A>Acc54$ are established), after it proceeds to step S254, it is determined whether or not the transition timer T54 is 0.

In a case where the determination result in the step S254 is "YES" (T54=0), it proceeds to step S255. Then, after the CC eco-mode is set to be 4, execution of this routine is temporarily ended. That is, the transition from the CC eco-mode 5 to the CC eco-mode 4 is performed. On the other hand, in a case where the determination result in the step S254 is "NO" (T54≠0), execution of this routine is temporarily ended without executing the processing of the step S255.

That is, when a state where all of the vehicle speed deviation condition $\Delta V<\Delta Vcc54$, the gradient condition $I<Icc54$, the throttle opening condition $TH<THh4$, and the acceleration condition $A>Acc54$ are satisfied is continued for a predetermined time (the time corresponding to the initial value set in the transition timer T54), the transition from the CC eco-mode 5 to the CC eco-mode 4 is performed. On the other hand, even if all of the four conditions are satisfied, since the CC eco-mode 5 is maintained until the predetermined time elapses, the transition to the CC eco-mode 4 is not performed. Accordingly, when the load instantaneously decreases due to unevenness or the like of the road surface, or the like, the complicated transition to another CC eco-mode can be prevented.

In the mode determination processing in this embodiment, since a plurality of throttle upper limit openings THh is set in the same target vehicle speed, it is possible to finely switch the throttle upper limit opening THh in a fuel-efficient area in accordance with the required driving force of the vehicle. For this reason, an area exhibiting a fuel-efficiency effect can be expanded without a sense of discomfort. In other words, since the throttle upper limit opening can be switched in accordance with the road gradient, the effect of improvement in fuel efficiency is large.

Further, the vehicle speed deviation threshold value $\Delta Vcc$ is set corresponding to the magnitude of the throttle upper limit opening THh. Here, the vehicle speed deviation threshold value $\Delta Vcc$ is set such that the larger the throttle upper limit opening THh, the larger the vehicle speed deviation threshold value. For this reason, the larger the set throttle upper limit opening THh, the more an area of output restriction by the throttle upper limit opening THh can be expanded. Accordingly, an area having a fuel efficiency effect can be expanded without a sense of discomfort.

Also, not only a vehicle speed deviation condition, in which the vehicle speed deviation $\Delta V$ is larger than the vehicle speed deviation threshold value $\Delta Vcc$, but also a gradient condition, in which the road gradient I is larger than the gradient threshold value Icc, is added to a condition which permits the transition of the CC eco-mode to the upper grade (in other words, to a condition for changing the throttle upper limit opening THh into a large throttle upper limit opening THh). For this reason, compared to a case where whether or not the throttle upper limit opening THh is changed is determined only by the vehicle speed deviation condition, more reliable determination becomes possible. That is, if the determination of whether or not the throttle upper limit opening THh is changed is made only by the vehicle speed deviation condition, there is a possibility that a situation where the throttle upper limit opening THh must be frequently changed may occur. On the contrary, if the gradient condition is added, the occurrence of such a situation can be suppressed.

Target Vehicle Speed Return Processing

Figure 10:
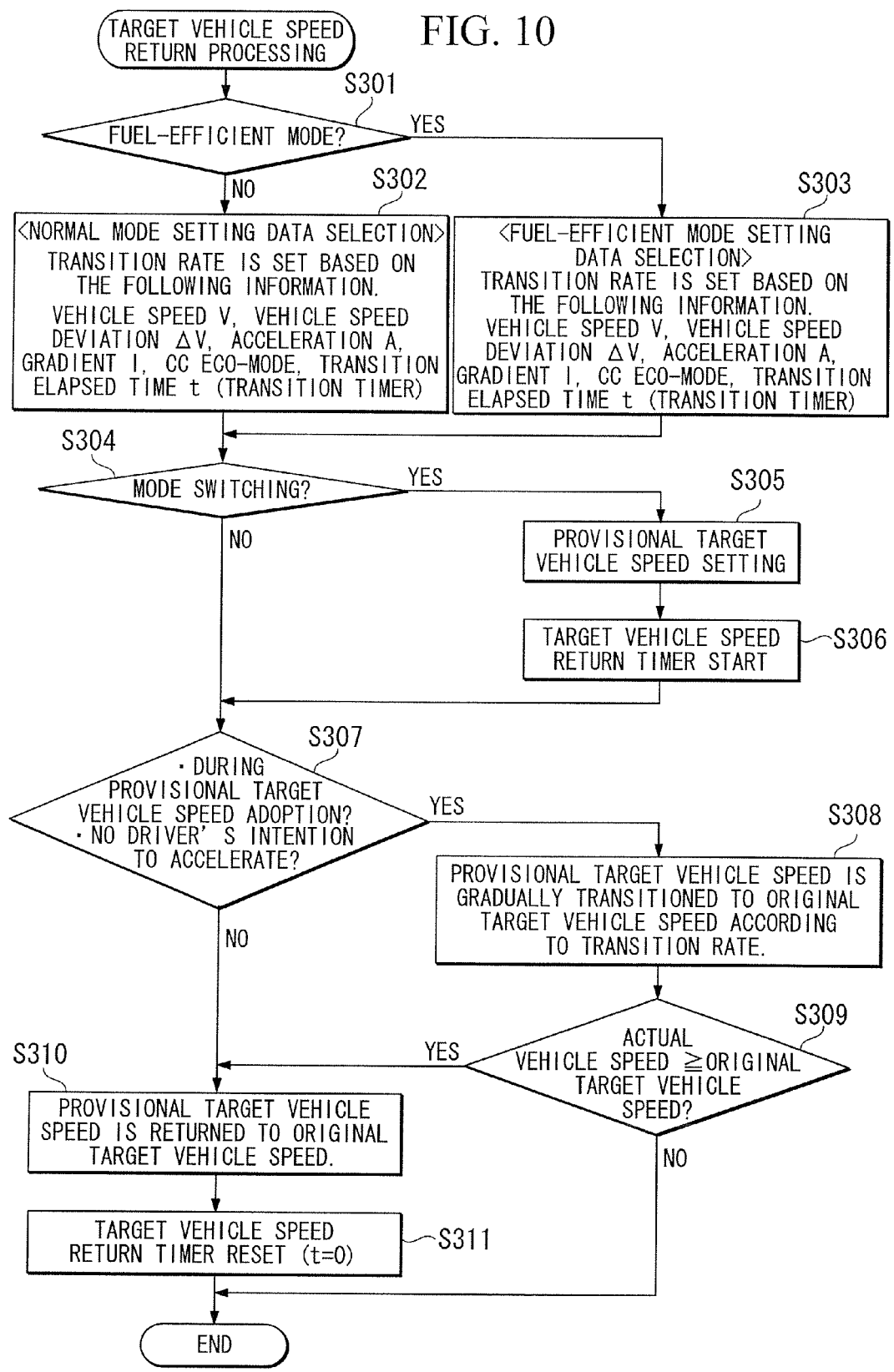
FIG. 10 is a flow chart showing a target vehicle speed return processing at the time of the cruise control of the running control device for a vehicle according to the embodiment.

Next, the target vehicle speed return processing which is executed in the step S300 will be described in accordance with the flow chart of FIG. 10.

First, in step S301, it is determined whether or not the fuel-efficient mode is selected.

In a case where the determination result in the step S301 is "NO", it proceeds to step S302. Then, after a transition rate from the provisional target vehicle speed to the original target vehicle speed, which is applied when switching the grade of the CC eco-mode at the time of the normal mode, is calculated with reference to a transition rate map for the normal mode (not shown) or by a calculating formula, based on the following information (j) to (o), this is set.

In other words, this transition rate is a restriction value of a variation (hereinafter referred to as a variation restriction value) per unit time of the provisional target vehicle speed.

(j) The current actual vehicle speed V (k) The vehicle speed deviation $\Delta V$ of the current actual vehicle speed V from the original target vehicle speed (l) The acceleration A (m) The gradient I of a road where the vehicle is running at present (n) The grade of the CC eco-mode before and after switching (o) The elapsed time t from the start of the switching of the CC eco-mode For example, the transition rate (the variation restriction value) is set such that the larger the actual vehicle speed V, the smaller the value of the transition rate (the variation restriction value). Then, the transition rate (the variation restriction value) is set such that the larger the vehicle speed deviation $\Delta V$, the larger the value of the transition rate (the variation restriction value). This is because even on a road having the same load variation, running resistance to the vehicle increases in proportion to the square of the actual vehicle speed. Accordingly, fuel consumption at the time of the target vehicle speed return during high speed running is suppressed by setting the transition rate such that the larger the actual vehicle speed V, the smaller the transition rate. Also, by setting the variation restriction value based on the vehicle speed deviation $\Delta V$, the target vehicle speed return processing can be performed without making the driver feel a sense of discomfort.

Also, in a case where the road gradient I is a rising gradient, the transition rate (the variation restriction value) is set to be small, and on the other hand, in a case where the road gradient I is a downhill gradient, the transition rate (the variation restriction value) is set to be large.

This is because the transition to the original target vehicle speed can be slowly carried out by setting the transition rate (the variation restriction value) to be small at the time of a rising gradient. For this reason, since the driving force output of the engine on an uphill road can be kept low, the effect of improvement in fuel efficiency is obtained.

On the other hand, on a downhill road, naturally, the driving force output of the engine is small. Therefore, by setting the transition rate (the variation restriction value) to be large at the time of a downhill gradient, it is possible to positively perform the return to the original target vehicle speed. Accordingly, fuel efficiency at the time of transition can be improved. Also, if the return of the actual vehicle speed to the original target vehicle speed is late despite a downhill road, the driver feels a sense of discomfort. Therefore, by setting the transition rate (the variation restriction value) to be large at the time of a downhill gradient, it is possible to not make the driver feel a sense of discomfort.

Also, after the elapsed time t from the start of the switching of the CC eco-mode is measured by a target vehicle speed return timer, which will be described later, the transition rate (the variation restriction value) may be corrected based on the elapsed time t and the vehicle speed deviation $\Delta V$. For example, in a case where the vehicle speed deviation $\Delta V$ does not become small even though the elapsed time t has increased, the transition rate (the variation restriction value) is corrected to become larger than usual. Accordingly, convergence of the actual vehicle speed to the target vehicle speed can be accelerated.

Also, in a case where actual acceleration is small compared with a target vehicle speed transition rate, a difference between the vehicle speed and the target vehicle speed during return becomes large. For this reason, in order to prevent the subsequent acceleration from becoming large, the transition rate is set to be small.

Also, since the grade of the CC eco-mode before and after switching has a correlation with the vehicle speed deviation $\Delta V$ and the road gradient I, the grade of the CC eco-mode before and after switching can also be used as the alternative values of $\Delta V$ and I.

On the other hand, in a case where the determination result in the step S301 is "YES", it proceeds to step S303. Then, after a transition rate from the provisional target vehicle speed to the original target vehicle speed, which is applied when switching the grade of the CC eco-mode at the time of the fuel-efficient mode, is calculated with reference to a transition rate map for the fuel-efficient mode (not shown) or by a calculating formula, based on the above-mentioned information (j) to (o), this is set.

After proceeding from the steps S302 and S303 to step S304, it is determined whether or not mode switching has occurred. In this mode switching, mode switching between the normal mode and the fuel-efficient mode, grade switching of the CC eco-mode at the time of the normal mode, and grade switching of the CC eco-mode at the time of the fuel-efficient mode are included.

In a case where the determination result in the step S304 is "YES" (the mode switching occurred), after it proceeds to step S305, the initial value of the provisional target vehicle speed is set. In this embodiment, the current actual vehicle speed V is set as the initial value of the provisional target vehicle speed. In addition, in the case of setting the initial value of the provisional target vehicle speed, after a correction is performed on the current actual vehicle speed V, which becomes the basics, in accordance with the present vehicle speed deviation $\Delta V$ or the grade of the CC eco-mode before and after switching, this may be set.

Next, it proceeds from the step S305 to step S306. Then, after time measurement by a target vehicle speed return timer is started, it proceeds to step S307. In addition, the target vehicle speed return timer is a timer which measures the elapsed time from execution of the mode switching. This timer is a count-up timer which counts up starting from 0.

On the other hand, when the determination result in the step S304 is "NO" (no mode switching), it proceeds to the step S307 without executing the processes of the steps S305 and S306.

Then, in the step S307, it is determined whether or not the provisional target throttle opening is being calculated by using the provisional target vehicle speed in place of the original target vehicle speed and whether or not there is no driver's intention to accelerate. In addition, a case where the initial value of the provisional target vehicle speed has been set in the step S305 is also included in a case where the provisional target throttle opening is calculated using the provisional target vehicle speed. Also, regarding the determination of the driver's intention to accelerate, it is determined that there is an intention to accelerate, for example, in a case where there is an operation to increase the vehicle speed by the driver stepping on an accelerator pedal, or the like.

In a case where the determination result in the step S307 is "YES", since the provisional target throttle opening is being calculated using the provisional target vehicle speed and the driver does not have intention to accelerate, it proceeds to step S308. Then, the provisional target vehicle speed is gradually returned to the original target vehicle speed in accordance with the transition rate set in the steps S302 and S303. That is, after the transition rate is set in the steps S302 and S303, the provisional target vehicle speed is made to gradually approximate the original target vehicle speed by restricting the variation per unit time of the provisional target vehicle speed based on this transition rate.

Figure 11:
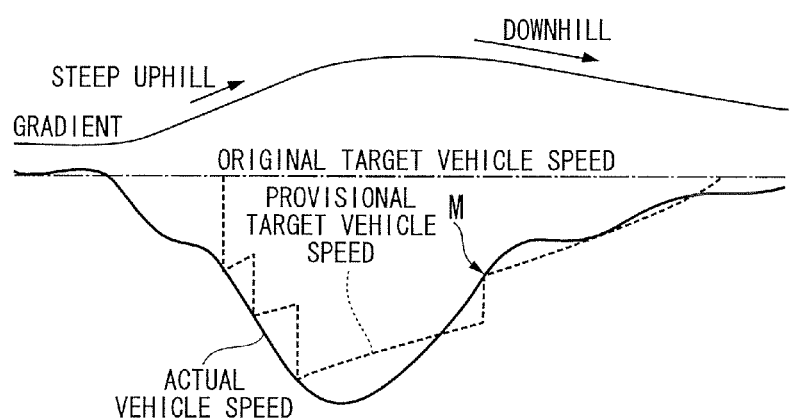
FIG. 11 is a diagram describing a provisional target vehicle speed setting method at the time of the cruise control of the running control device for a vehicle according to the embodiment.

Here, while the provisional target vehicle speed is made to gradually approximate the original target vehicle speed, as shown in an M point in FIG. 11, in a case where the actual vehicle speed V has become greater than the provisional target vehicle speed by a value greater than or equal to a predetermined value, the value of the current actual vehicle speed V is set as the provisional target vehicle speed. By making the provisional target vehicle speed increase to the usual or greater in this manner, convergence of a vehicle speed to the original target vehicle speed can be accelerated.

In addition, instead of making the value of the current actual vehicle speed V the provisional target vehicle speed, the provisional target vehicle speed may be increased to be more than or equal to the transition rate (the variation restriction value).

Figure 12:
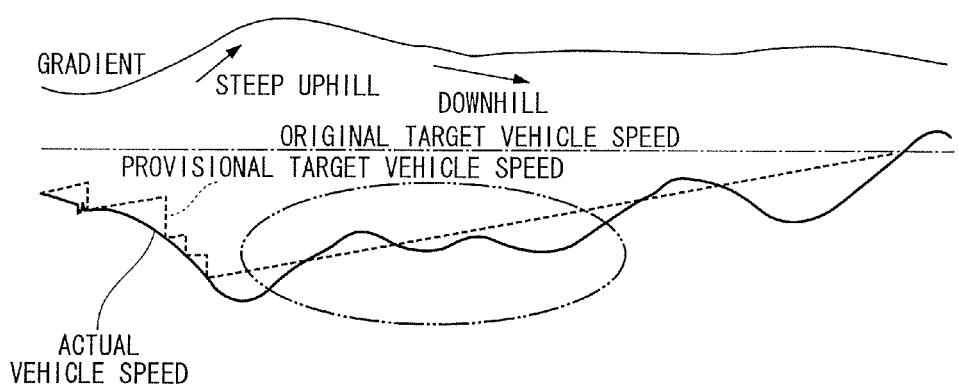
FIG. 12 is a time chart showing a change in an actual vehicle speed in a comparative example.

FIG. 12 shows a comparative example and also shows a case where control to maintain the transition rate (the variation restriction value) of the provisional target vehicle speed is continued even in a case where the actual vehicle speed V has exceeded the provisional target vehicle speed. The original purpose of the target vehicle speed return process is to converge the actual vehicle speed V with the original target vehicle speed. If the control to maintain the transition rate (the variation restriction value) is continued regardless of the actual vehicle speed V exceeding the provisional target vehicle speed and then approaching the original target speed, the actual vehicle speed V is drawn to the provisional target vehicle speed, thereby being reduced. For this reason, convergence to the original target speed becomes slow.

Next, after proceeding from the step S308 to step S309, it is determined whether or not the current actual vehicle speed V is greater than or equal to the original target vehicle speed. In a case where the determination result in the step S309 is "NO" (the actual vehicle speed<the original target vehicle speed), execution of this routine is temporarily ended.

In a case where the determination result in the step S307 is "NO" and a case where the determination result in the step S309 is "YES", it proceeds to step S310.

The case where the determination result in the step S307 is "NO" is a case where calculation of the target throttle opening with application of the provisional target vehicle speed has not been performed or the driver has an intention to accelerate. In this case, in the step S310, the provisional target vehicle speed is immediately returned to the original target vehicle speed. This is for returning the throttle opening control to the original state without causing a sense of discomfort to the driver, by immediately returning the provisional target vehicle speed to the original target vehicle speed when an operation to increase the actual vehicle speed by intervention of an accelerator pedal, or the like has occurred, Also, the case where the determination result in the step S309 is "YES" is a time when the actual vehicle speed V is greater than or equal to the original target vehicle speed. Accordingly, also in this case, in the step S310, the provisional target vehicle speed is immediately returned to the original target vehicle speed. For example, when the vehicle speed rises due to running downhill or a change in the target vehicle speed towards deceleration due to the driver's operation, the actual vehicle speed V becomes sometimes greater than or equal to the original target vehicle speed. In such a case, by immediately returning the provisional target vehicle speed to the original target vehicle speed, it is possible to return the throttle opening control to the original state without causing a sense of discomfort to the driver.

Next, it proceeds from the step S310 to step S311. Then, after the transition timer is reset (t=0), execution of this routine is temporarily ended.

In this manner, in the case of switching the throttle upper limit opening to the throttle upper limit opening with more moderate restriction, the provisional target vehicle speed is set and on the other hand, the vehicle speed deviation ΔV from the actual vehicle speed V is calculated by using the provisional target vehicle speed in place of the original target vehicle speed. Then, since the target throttle opening is calculated based on this vehicle speed deviation, a rapid increase in the throttle opening (that is, a rapid increase in the driving force output) accompanying the switching of the throttle upper limit opening can be prevented. Accordingly, the fuel efficiency can be improved.

Furthermore, since the provisional target vehicle speed is made to gradually approximate the original target vehicle speed, recovery control which returns the lowered vehicle speed to the original target vehicle speed can be carried out without sudden acceleration. Accordingly, return to an original control state can be performed with the output of a small driving force.

FIG. 13 shows time charts of the throttle opening or the like at the time of the cruise control running. The lower half of this drawing shows a case where the throttle opening control (driving force control) is performed with a plurality of throttle upper limit openings set at the time of the cruise control running, similarly to the above-described embodiment. Also, the upper half of this drawing shows a case where the throttle opening control is performed without setting the throttle upper limit opening.

From this drawing, it can be seen that in the case of the embodiment, although variations in the vehicle speed becomes greater than the case of the comparative example, variations in the throttle opening can be suppressed. Therefore, in the embodiment, fuel efficiency becomes superior to the comparative example.

Other Embodiments

In addition, the technical scope of the present invention is not limited only to the above-described embodiment, but includes various changes applied to the above-described embodiment within the scope that does not depart from the purport of the present invention. That is, the specific processing, configuration, or the like mentioned in this embodiment is only one example and appropriate changes are possible.

For example, in the above-described embodiment, the target driving force which is calculated by the target driving force calculating means is set to be the target throttle opening. However, the target driving force may be set to be an accelerator pedal opening or torque.

INDUSTRIAL APPLICABILITY

According to the running control device for a vehicle according to the present invention, in the cruise control, restriction of a driving force can be performed. Accordingly, since the driving force of the engine can be accurately restricted regardless of the vehicle speed or the state of a driving force transmission device, fuel efficiency in the cruise control can be improved.

DESCRIPTION OF REFERENCE NUMERALS AND SIGNS

14 Vehicle speed sensor
31 Engine and transmission control section (gradient amount acquiring means)
32 Cruise control section
34 Throttle opening control section (driving force control section)
35 Target vehicle speed setting section (target vehicle speed setting means)
36 Vehicle speed allowed lowering value setting section (vehicle speed allowed lowering value setting means)
37 Throttle upper limit opening calculation section (target driving force upper limit value calculating means)
38 Target throttle opening calculation section (target driving force calculating means)

The invention claimed is:

1. A running control device for a vehicle, comprising:
a vehicle speed sensor which detects an actual vehicle speed of the vehicle;
a target vehicle speed setting section which sets a target vehicle speed;
a target driving force calculation section which calculates a target driving force based on a vehicle speed deviation of the actual vehicle speed detected by the vehicle speed sensor from the target vehicle speed set by the target vehicle speed setting section;
a driving force control section which performs driving force control based on the target driving force calculated in the target driving force calculation section;

a vehicle speed allowed lowering value setting section which sets an allowed lowering value of the actual vehicle speed with respect to the target vehicle speed; and a target driving force upper limit value calculation section which calculates a target driving force upper limit value based on the actual vehicle speed, wherein in a case where an amount by which the actual vehicle speed is lowered with respect to the target vehicle speed is within the allowed lowering value, the target driving force calculation section restricts the target driving force to be less than or equal to the target driving force upper limit value calculated by the target driving force upper limit value calculation section, and the driving force control section performs driving force control based on the restricted target driving force.

2. The running control device for a vehicle according to claim 1, wherein:

the target driving force upper limit value calculation section calculates a plurality of different target driving force upper limit values; and in a case where the actual vehicle speed has been lowered lower than the target vehicle speed by a value more than or equal to the allowed lowering value, the target driving force calculation section switches the target driving force upper limit value to a larger target driving force upper limit value than a target driving force upper limit value set at this time, thereby performing restriction of the target driving force.

3. The running control device for a vehicle according to claim 2, wherein the allowed lowering value setting section sets allowed lowering values corresponding to magnitudes of the plurality of target driving force upper limit values calculated by the target driving force upper limit value calculation section and sets the allowed lowering value such that the larger the target driving force upper limit value in the plurality of target driving force upper limit values, the larger the allowed lowering value.

4. The running control device for a vehicle according to claim 2, wherein when performing switching of the target driving force upper limit value, the target driving force calculation section calculates the target driving force by using a provisional target vehicle speed obtained based on the current actual vehicle speed or the target vehicle speed, in place of an original target vehicle speed set by the target vehicle speed setting section and gradually approximates the provisional target vehicle speed to the original target vehicle speed.

5. The running control device for a vehicle according to claim 4, wherein the target driving force calculation section gradually approximates the provisional target vehicle speed to the original target vehicle speed by restricting a variation per unit time of the provisional target vehicle speed and calculates a variation restriction value per unit time of the provisional target vehicle speed based on the actual vehicle speed or a deviation of the actual vehicle speed from the original target vehicle speed.

6. The running control device for a vehicle according to claim 5, wherein in a case where the actual vehicle speed has become greater than the provisional target vehicle speed by a value more than or equal to a predetermined value while the provisional target vehicle speed is made to gradually approximate the original target vehicle speed, the target driving force calculation section sets the value of the current actual vehicle speed as the provisional target vehicle speed or increases the provisional target vehicle speed to be more than or equal to the variation restriction value.

7. The running control device for a vehicle according to claim 4, wherein in a case where the actual vehicle speed has become greater than or equal to the original target vehicle speed while the provisional target vehicle speed is made to gradually approximate the original target vehicle speed, the target driving force calculation section stops calculation of the target driving force using the provisional target vehicle speed and starts calculation of the target driving force using the original target vehicle speed.

8. The running control device for a vehicle according to claim 2, further comprising a gradient amount acquisition section which acquires an amount of gradient of a subject vehicle running path, wherein the target driving force upper limit value calculation section calculates the target driving force upper limit value based on the amount of gradient acquired by the gradient amount acquisition section, and wherein in a case where the amount by which the actual vehicle speed is lowered with respect to the target vehicle speed is larger than the allowed lowering value and the amount of gradient acquired by the gradient amount acquisition section becomes more than or equal to a predetermined determination threshold value, the target driving force calculation section performs restriction of the target driving force by using a larger target driving force upper limit value than a target driving force upper limit value set at this time.

9. The running control device for a vehicle according to claim 1, further comprising a gradient amount acquisition section which acquires an amount of gradient of a subject vehicle running path, wherein the target driving force upper limit value calculation section calculates the target driving force upper limit value based on the amount of gradient acquired by the gradient amount acquisition section.

10. The running control device for a vehicle according to claim 9, wherein the allowed lowering value setting section increases the allowed lowering value of the actual vehicle speed with respect to the target vehicle speed in accordance with an increase in the amount of gradient acquired by the gradient amount acquisition section.

11. The running control device for a vehicle according to claim 9, wherein the target driving force calculation section gradually approximates a provisional target vehicle speed to the original target vehicle speed by restricting a variation per unit time of the provisional target vehicle speed and calculates a variation restriction value per unit time of the provisional target vehicle speed based on the amount of gradient acquired by the gradient amount acquisition section.

12. The running control device for a vehicle according to claim 1, further comprising a mode switching section which switches a driving force control content between a normal mode that restricts the target driving force and a fuel-efficient mode that further restricts the target driving force than in the normal mode, wherein the target driving force upper limit value in the normal mode is made to be different from the target driving force upper limit value in the fuel-efficient mode.

* * * * *